(12) United States Patent
Akiyama et al.

(10) Patent No.: US 12,555,212 B2
(45) Date of Patent: Feb. 17, 2026

(54) OBJECT DETECTION DEVICE AND METHOD FOR DETECTING MALFUNCTION OF OBJECT DETECTION DEVICE

(71) Applicant: DENSO CORPORATION, Kariya (JP)

(72) Inventors: Keiko Akiyama, Kariya (JP); Daisuke Takasao, Kariya (JP); Yukihiro Joh, Kariya (JP); Hitoshi Noguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 535 days.

(21) Appl. No.: 18/063,939

(22) Filed: Dec. 9, 2022

(65) Prior Publication Data

US 2023/0104430 A1 Apr. 6, 2023

Related U.S. Application Data

(63) Continuation of application No. PCT/JP2021/024935, filed on Jul. 1, 2021.

(30) Foreign Application Priority Data

Jul. 21, 2020 (JP) .................................. 2020-124176
Jun. 29, 2021 (JP) .................................. 2021-107544

(51) Int. Cl.
*G06T 7/00* (2017.01)
*G06V 10/141* (2022.01)
*G06V 10/98* (2022.01)

(52) U.S. Cl.
CPC .......... *G06T 7/0002* (2013.01); *G06V 10/141* (2022.01); *G06V 10/993* (2022.01)

(58) Field of Classification Search
CPC .. G06T 7/0002; G06V 10/141; G06V 10/993; G06F 2203/69; G02B 6/3586
See application file for complete search history.

(56) References Cited

U.S. PATENT DOCUMENTS

| 9,537,956 | B1* | 1/2017 | Sibenac | H04W 56/001 |
| 2018/0316839 | A1* | 11/2018 | Nakata | H04N 23/69 |
| 2018/0350868 | A1 | 12/2018 | Chen | |
| 2019/0265356 | A1 | 8/2019 | Ueno et al. | |
| 2021/0041539 | A1* | 2/2021 | Darrer | G01S 7/481 |

FOREIGN PATENT DOCUMENTS

| JP | 2015-155855 A | 8/2015 |
| WO | 2014/148161 A1 | 9/2014 |

* cited by examiner

*Primary Examiner* — Gregory A Morse
*Assistant Examiner* — Ty Mitchell Beatty
(74) *Attorney, Agent, or Firm* — Posz Law Group, PLC

(57) ABSTRACT

An object detection device for detecting an object includes a light receiving section, an image acquisition part, and a malfunction detection part. The light receiving section has a light receiving surface in which light receiving elements capable of receiving incident light including reflected light of emitted radiated light are arranged in a plane, and outputs a first light receiving signal according to a light receiving state of the light receiving element in a first area, when a predetermined usable area in the usable areas on the light receiving surface is referred to as a first area. The image acquisition part acquires an ambient light image indicating a light receiving intensity of ambient light using the first light receiving signal. A malfunction detection part detects a malfunction of the light receiving element in the first area using the ambient light image.

20 Claims, 27 Drawing Sheets

OBJECT DETECTION DEVICE AND METHOD FOR DETECTING MALFUNCTION OF OBJECT DETECTION DEVICE

CROSS REFERENCE TO RELATED APPLICATIONS

The present application is a continuation application of International Patent Application No. PCT/JP2021/024935 filed on Jul. 1, 2021, which designated the U.S. and claims the benefit of priority from Japanese Patent Application No. 2020-124176 filed in Japan filed on Jul. 21, 2020 and Japanese Patent Application No. 2021-107544 filed in Japan filed on Jun. 29, 2021, the entire disclosure of the above application is incorporated herein by reference.

TECHNICAL FIELD

The present disclosure relates to an object detection device.

BACKGROUND

Various techniques for detecting malfunctions in object detection devices such as an imaging device and an optical distance measuring device have been proposed.

Therefore, there is a demand for a technique for accurately detecting malfunction in the object detection device.

SUMMARY

According to one embodiment of the present disclosure, an object detection device for detecting an object is provided. The object detection device includes a light receiving section that has a light receiving surface in which a plurality of light receiving elements capable of receiving incident light including reflected light of emitted radiated light are arranged in a plane, and that outputs a first light receiving signal according to a light receiving state of the light receiving element in a first area, when a predetermined usable area in the usable areas on the light receiving surface is referred to as a first area, an image acquisition part that acquires an ambient light image indicating a light receiving intensity of ambient light using the first light receiving signal, and a malfunction detection part that detects a malfunction of the light receiving element in the first area using the ambient light image.

BRIEF DESCRIPTION OF DRAWINGS

The above and other objects, features and advantages of the present disclosure will become more apparent from the following detailed description made with reference to the accompanying drawings.

In the drawings.

DETAILED DESCRIPTION

Figure 1:
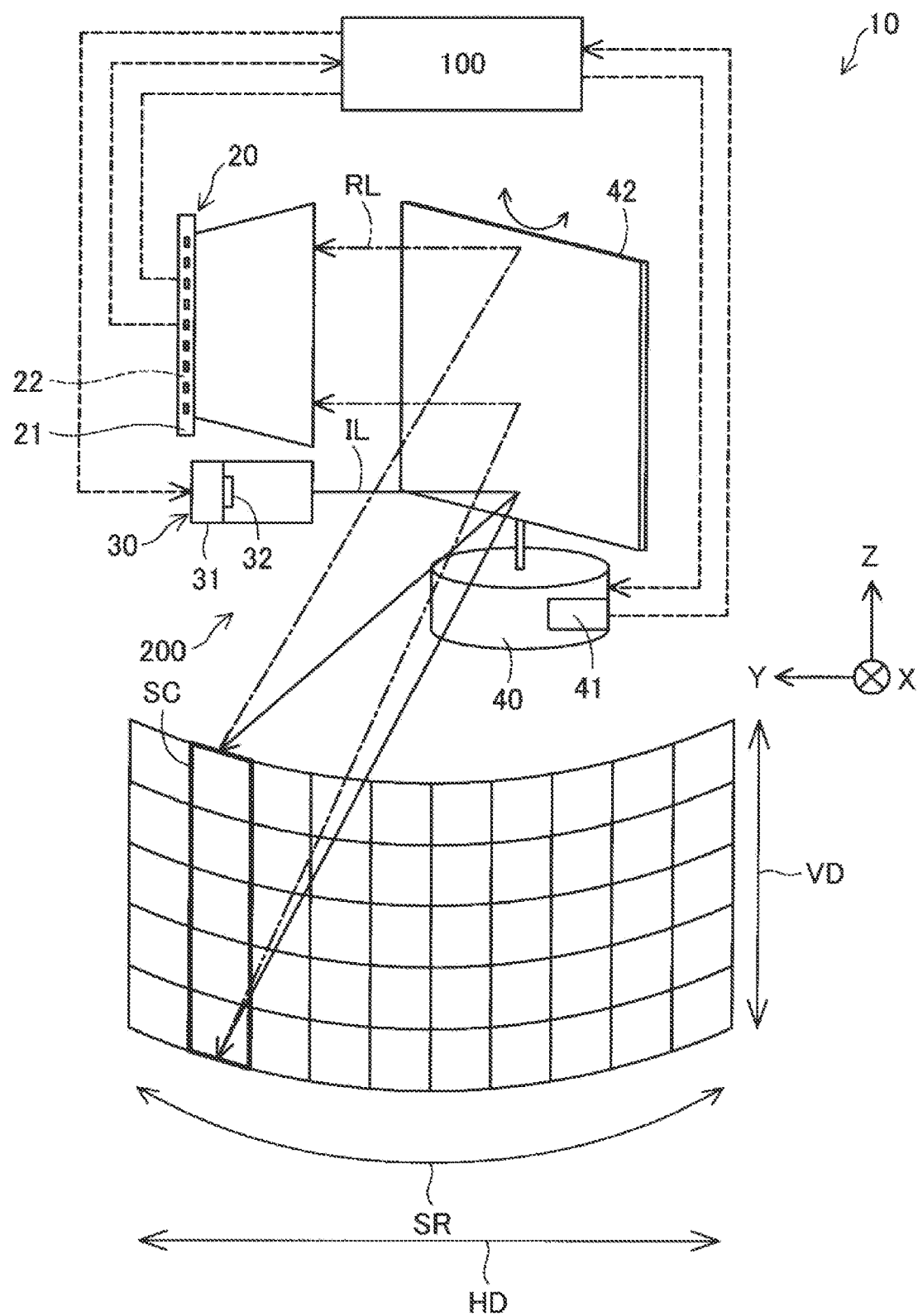
FIG. 1 is an explanatory diagram showing a schematic configuration of an object detection device.

In an assumable example, various techniques for detecting malfunctions in object detection devices such as an imaging device and an optical distance measuring device have been proposed. For example, in a frame image obtained by an imaging device, the malfunction of the imaging device is detected by comparing brightness for each pixel using a current frame image and a previous frame image temporally past the current frame image.

However, the technique described requires captured images acquired in the past, so there is a risk that a load on the object detection device will increase or a responsiveness will decrease. In addition, since the presence or absence of malfunction occurrence is detected for each pixel of the captured image, there is a possibility that malfunction occurrence cannot be detected with high accuracy. Such a problem also arises in the case of detecting a malfunction of a light receiving element that receives the reflected light of the emitted radiated light when the object detection device is composed of a light detection and ranging (LIDAR). Therefore, there is a demand for a technique for accurately detecting malfunction in the object detection device.

According to one embodiment of the present disclosure, an object detection device for detecting an object is provided. The object detection device includes a light receiving section that has a light receiving surface in which a plurality of light receiving elements capable of receiving incident light including reflected light of emitted radiated light are arranged in a plane, and that outputs a first light receiving signal according to a light receiving state of the light receiving element in a first area, when a predetermined usable area in the usable areas on the light receiving surface is referred to as a first area, an image acquisition part that acquires an ambient light image indicating a light receiving intensity of ambient light using the first light receiving signal, and a malfunction detection part that detects a malfunction of the light receiving element in the first area using the ambient light image.

According to the object detection device having the configuration described above, an ambient light image is obtained using the first light receiving signal corresponding to the light receiving state of the light receiving elements in the first area in the light receiving element array in which the plurality of light receiving elements are arranged in a plane. Since the malfunction of the light receiving element in the first area is detected using the acquired ambient light image Img1, the load on the object detection device can be reduced and the malfunction of the light receiving element can be accurately detected.

The present disclosure can be realized as the following embodiments. For example, those embodiments can be realized in the form of a malfunction detection device for an object detection device, a malfunction detection method for an object detection device, a computer program for realizing these device and method, and a storage medium storing such a computer program.

A. First Embodiment

A1. Device Configuration:

As shown in FIG. 1, an object detection device 10 as one embodiment of the present disclosure includes a distance measuring unit 200 and a control unit 100. The object detection device 10 is mounted on a vehicle, and detects objects existing around the vehicle by obtaining information on the surroundings of the vehicle, for example, distances to targets around the vehicle. FIG. 1 shows three axes, the X-axis, the Y-axis and the Z-axis that are orthogonal to each other. The X-axis is parallel to a horizontal direction HD and the Z-axis is parallel to a vertical direction VD. The X-axis, Y-axis and Z-axis described in other drawings all correspond to the X-axis, Y-axis and Z-axis in FIG. When specifying the direction, a positive direction is indicated by "+" and a negative direction is indicated by "−", and both positive and negative signs are used for direction notation. The X direction corresponds to a subordinate concept of a first direction in the present disclosure, and the Z direction corresponds to a subordinate concept of a second direction in the present disclosure. The +X direction corresponds to a subordinate concept of one side of the first direction, and the +Z direction corresponds to a subordinate concept of one side of the second direction.

The distance measuring unit 200 is LiDAR (Light Detection And Ranging). The distance measuring unit 200 detects a distance and shape of a target relative to the vehicle by emitting radiated light IL and receiving reflected light reflected by the target. In addition to the reflected light from the object, the distance measuring unit 200 receives light other than the reflected light, namely the ambient light (hereinafter also referred to as "background light"), such as sunlight, light from a street lamp, light from the headlights of other vehicles, and light reflected by the object due to these lights. The distance measuring unit 200 identifies light obtained by removing background light from the received light as reflected light from the object, and calculates the time from emitting the radiated light IL to receiving of the reflected light, that is, the time of flight (TOF) of the light as the distance to the object.

The distance measuring unit 200 includes a light receiving section 20, a light emitting section 30, a scanning mirror 42, an electric motor 40 and a rotation angle sensor 41. For example, when scanning in the horizontal direction HD, the distance measuring unit 200 has a predetermined scanning angle range SR in the horizontal direction HD, and emits the radiated light IL by the light emitting section 30 and receives the incident light RL by the light receiving section 20 in units of unit scanning angles SC obtained by dividing the scanning angle range SR into a plurality of angles. So, the distance measuring unit 200 acquires detection points over the entire scanning angle range SR to realize distance measurement. The unit scanning angle SC defines a resolving power of the distance measuring unit 200 or a resolution of the distance measurement result obtained by the distance measuring unit 200. As the unit scanning angle SC becomes smaller, that is, as the number of detection points increases, the resolving power and the resolution in the horizontal direction HD becomes higher. Acquisition of detection points in the distance measuring unit 200, that is, light emitting and light receiving processing, is performed when the scanning angle range SR is scanned forward in one direction, or when the scanning angle range SR is scanned back and forth in both directions. The scanning direction may be the vertical direction VD. In this case, the X direction is parallel to the vertical direction VD, and the Z direction is parallel to the horizontal direction HD.

The light receiving section 20 includes a light receiving element array 22, a light receiving control unit 21, and a light receiving lens 23 (not shown in FIG. 1), and performs a light receiving process of outputting a light receiving state of incident light including reflected light of the radiated light IL emitted from the light emitting section 30, for example, outputting a light receiving signal corresponding to the light receiving amount and light receiving intensity.

Figure 2:
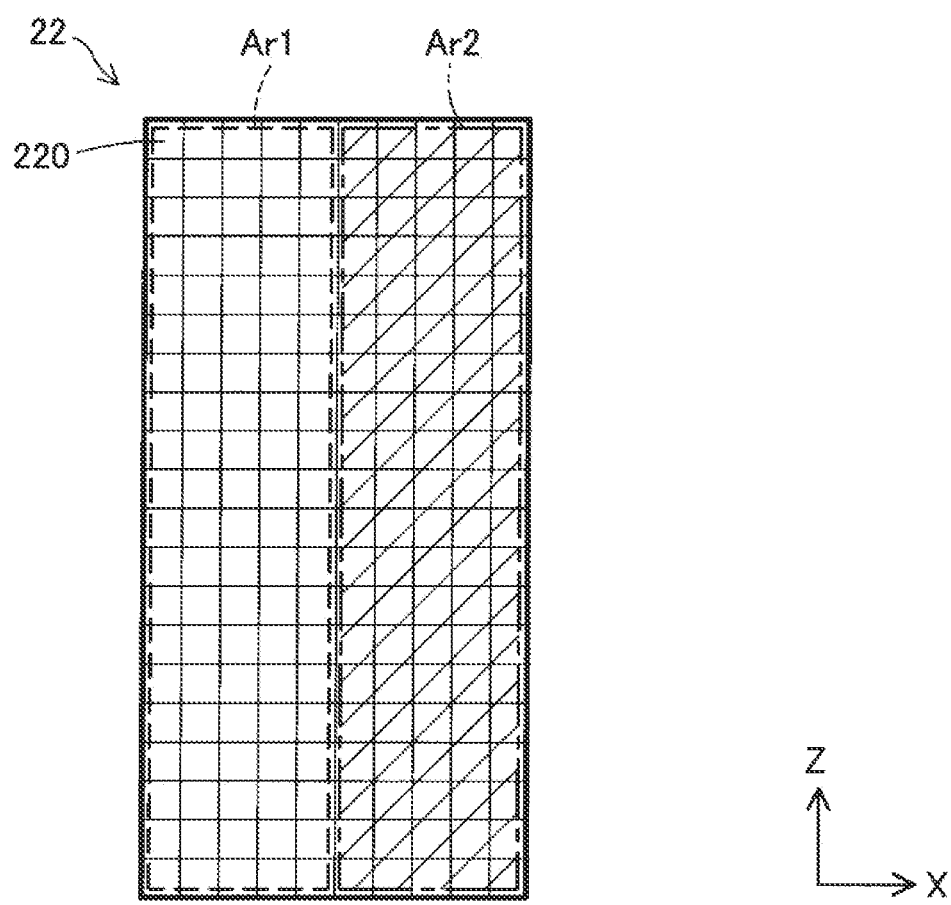
FIG. 2 is an explanatory diagram schematically showing the configuration of a light receiving element array.

As shown in FIG. 2, the light receiving element array 22 is an optical sensor that has a light receiving surface in which a plurality of light receiving elements 220 are arranged vertically and horizontally, that is, two-dimensionally, and can receive incident light. For example, SPAD (Single Photon Avalanche Diode) and other photodiodes constitute each light receiving element. In the present embodiment, the light receiving element array 22 has a plurality of usable areas set in advance. The usable is exclusively selected according to the operation mode of the distance measuring unit 200 and light receiving processing is performed using the light receiving elements 220 within the selected usable area. The operation modes include a "normal mode" in which the distance measuring unit 200 operates normally, a "malfunction detection mode" in which malfunction of the light receiving element 220 is detected in the normal mode, and a "malfunction countermeasure mode" in which normal operation is performed using the light receiving element 220 in which no malfunction has been detected when a malfunction of the light receiving element 220 is detected in the malfunction detection mode.

As shown in FIG. 2, the light receiving element array 22 is divided into a first usable area Ar1 and a second usable area Ar2. For example, the first usable area Ar1 is an area used in the normal mode and malfunction detection mode. The second usable area Ar2 is an area used in the malfunction countermeasure mode. That is, the first usable area Ar1 is an area used for the light receiving processing in normal, and the second usable area Ar2 is a preliminary area used for light receiving processing when the malfunction occurs in the first usable area Ar1.

Figure 3:
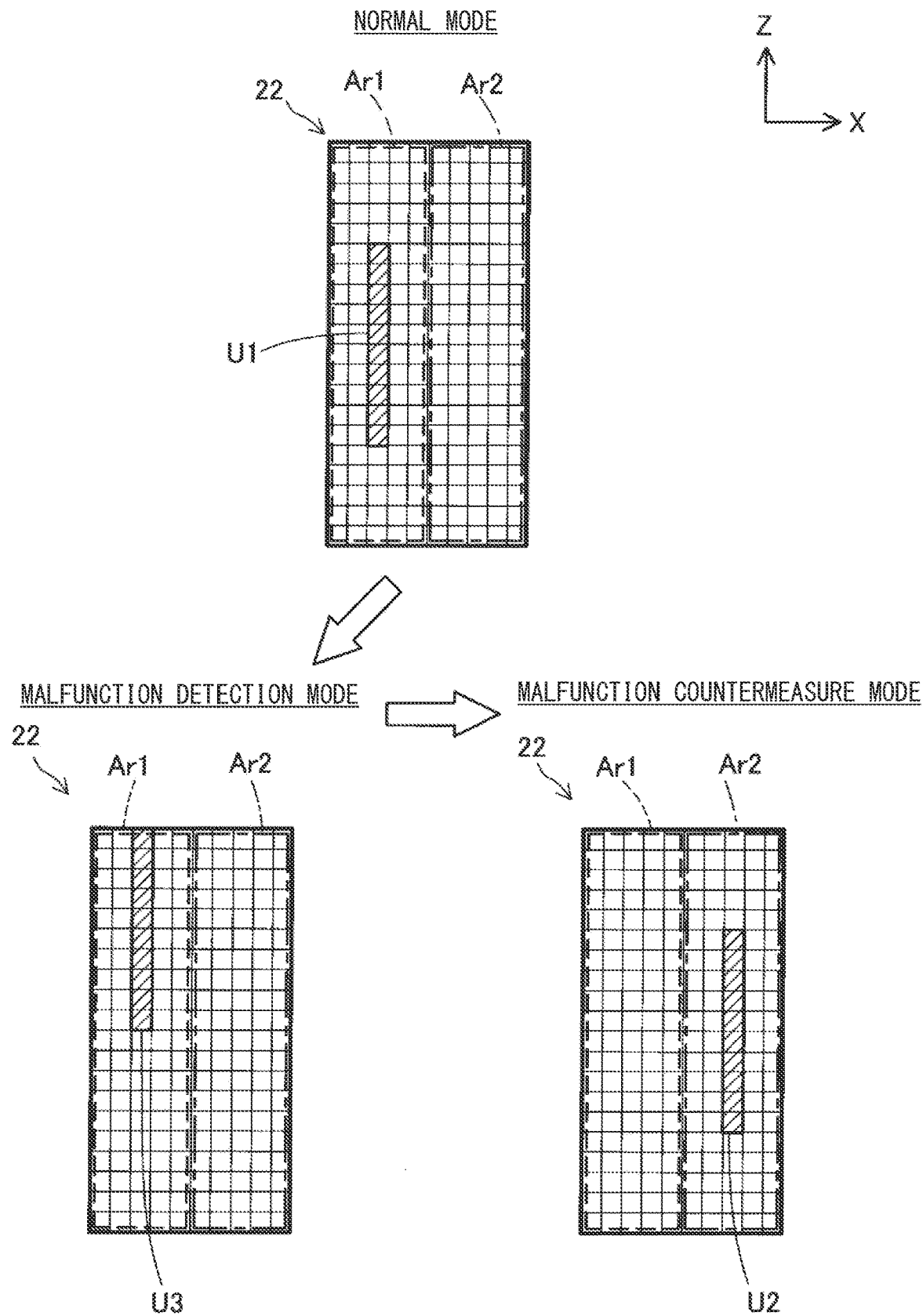
FIG. 3 is an explanatory diagram showing an example of an usable area.

As indicated by hatching in an upper part of FIG. 3, in the normal mode, a first area U1 within the first usable area Ar1 is used. The first area U1 is configured by a plurality of light receiving elements 220 within a predetermined range in the first usable area Ar1. The light receiving section 20 outputs a light receiving signal (hereinafter referred to as "first light receiving signal") corresponding to the light receiving state of the light receiving element 220 in the first area U1.

As hatched in a lower left part of FIG. 3, a third area U3 is used in the malfunction detection mode. The third area U3 is an area obtained by translating the first area U1 in the +Z direction, and may partially overlap with the first area, or may not overlap with the first area. Also, the third area U3 may be an area obtained by translating the first area U1 in the −Z direction. The light receiving section 20 outputs a light receiving signal (hereinafter referred to as "third light receiving signal") corresponding to the light receiving state of the light receiving element 220 in the third area U3.

As hatched in a lower right of FIG. 3, the second area U2 is used in the malfunction countermeasure mode. The second area U2 is an area obtained by translating the first area U1 in the +X direction. The light receiving section 20 outputs a light receiving signal (hereinafter referred to as "second light receiving signal") corresponding to the light receiving state of the light receiving element 220 in the second area U2.

The distance measuring unit 200 includes a mechanism for changing areas U1, U2, and U3, and by controlling the mechanism according to switching of the operation mode, it is possible to realize light receiving processing using the areas U1, U2, and U3 according to each operation mode. The mechanism for changing the areas U1, U2 and U3 will be described later.

The light receiving control unit 21 executes the light receiving processing that outputs an incident light intensity signal corresponding to the amount or intensity of incident light incident on the light receiving elements 220 in the areas U1, U2, and U3 in units of scanning angles SC at which light is emitted by the light emitting section 30.

The light emitting section 30 includes a light emitting control unit 31, a light emitting element 32, and a collimator lens, and emits the radiated light IL once or discretely multiple times in units of each unit scanning angle SC. The light emitting element 32 is, for example, one or more infrared laser diodes, and emits infrared laser light as the radiated light IL. The light emitting section 30 may have a single light emitting element 32 in the vertical direction VD, or may have a plurality of light emitting elements 32. The light emitting control unit 31 drives the light emitting element 32 with a drive signal having a pulse drive waveform to emit infrared laser light, in response to a light emitting control signal that instructs light emitting of the light emitting element 32 input from the control unit 100 for each unit scanning angle SC. The infrared laser light emitted from the light emitting section 30 is reflected by the scanning mirror 42 and emitted toward the outside of the distance measuring unit 200, that is, the range where detection of the target object is desired.

The electric motor 40 has an electric motor driver (not shown). The electric motor 40 has a rotation angle sensor 41 for detecting the rotation angle of the electric motor 40. An electric motor driver receives a rotation angle instruction signal output by the control unit 100 that receives the input of the rotation angle signal from the rotation angle sensor 41, and changes the voltage applied to the electric motor 40 to control a rotation angle of the electric motor 40. The electric motor 40 is, for example, an ultrasonic motor, a brushless motor, or a brush motor, and has a well-known mechanism for reciprocating within the scanning angle range SR. The scanning mirror 42 is attached to the tip of the output shaft of the electric motor 40.

The scanning mirror 42 is a reflector that scans the radiated light IL emitted from the light emitting section 30 in the horizontal direction HD, that is, a mirror body. Scanning of the scanning angle range SR in the horizontal direction HD is realized by being reciprocatingly driven by the electric motor 40. The scanning mirror 42 achieves scanning of detection light and receiving of reflected light in a scanning angle range of 120 degrees and 180 degrees, for example. When the scanning mirror 42 is provided with a single light emitting element or when the detection light cannot be emitted in the entire vertical direction VD, the scanning mirror 42 may realize scanning in the vertical direction VD in addition to the horizontal direction HD, that is, changing the scanning position in the vertical direction VD. In order to achieve scanning in the horizontal direction HD and the vertical direction VD, the scanning mirror 42 may be a polygonal mirror, for example, and may have a single facet mirror with a mechanism that swings in the vertical direction VD, or another single facet mirror that swings in the vertical direction VD. The scanning mirror 42 may be rotationally driven by the electric motor 40 to perform rotational scanning. In this case, light emitting/light receiving processing is performed by the light emitting section 30 and the light receiving section 20 corresponding to the scanning angle range SR.

The radiated light IL emitted from the light emitting section 30 is reflected by the scanning mirror 42 and scanned over the scanning angle range SR in the horizontal direction HD in units of the unit scanning angle SC. The reflected light of the radiated light IL reflected by the target is reflected by the scanning mirror 42 to the light receiving section 20 and is incident on the light receiving section 20 for each unit scanning angle SC. The unit scanning angle SC at which light receiving processing is performed is sequentially incremented, and as a result, scanning for light receiving processing over the desired scanning angle range SR becomes possible. If the detection light cannot be emitted to the entire area in the vertical direction VD, the irradiation position in the vertical direction VD is changed during each scanning in the horizontal direction HD, and scanning in the horizontal direction HD is performed multiple times. The light emitting section 30 and the light receiving section 20 may be rotated together with the scanning mirror 42 by the electric motor 40, or need not be rotated by the electric motor 40 separately from the scanning mirror 42. Furthermore, a configuration in which a plurality of light emitting elements 32 and light receiving element arrays 22 are arranged in an array without the scanning mirror 42, the laser light is successively directly emitted to the outside, and the reflected light is directly received may be provided.

Figure 4:
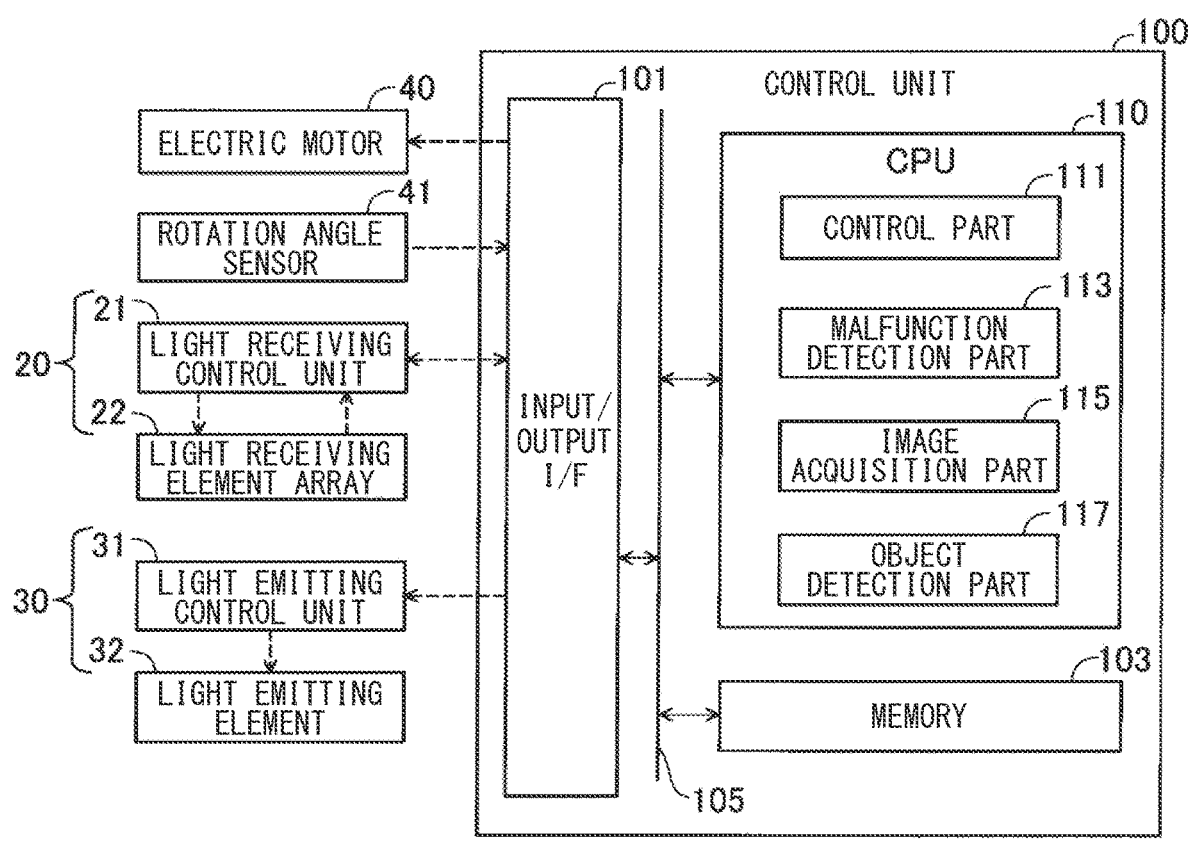
FIG. 4 is a block diagram showing a functional configuration of a control device.

As shown in FIG. 4, the control unit 100 includes a CPU 110, a memory 103 and an input/output interface 101. The CPU 110, the memory 103, and the input/output interface 101 are connected via a bus 105 so as to be bidirectionally communicable. The memory 103 includes ROM, RAM, and EEPROM. The light emitting control unit 31, the light receiving control unit 21, the electric motor 40, and the rotation angle sensor 41 is connected to the input/output interface 101 through respective control signal lines. A light emitting control signal is transmitted to the light emitting control unit 31, and a light receiving control signal that instructs light receiving processing for acquiring ambient light or light receiving processing for object detection corresponding to transmission of light emitting control signal is transmitted to the light receiving control unit 21. A light receiving signal is transmitted from the light receiving control unit 21 to the input/output interface 101. A rotation angle instruction signal is transmitted to the electric motor 40 and a rotation angle signal is received from the rotation angle sensor 41 to the input/output interface 101.

CPU 110 functions as a control part 111, malfunction detection part 113, an image acquisition part 115, and an object detection part 117 by developing and executing programs stored in the memory 103.

The control part 111 controls the operation of the object detection device 10 as a whole. The malfunction detection part 113 detects a malfunction of the light receiving element 220 within the first usable area Art, more specifically, the light receiving element 220 within the first area U1. The image acquisition part 115 acquires an ambient light image that indicates a light receiving intensity of ambient light. The object detection part 117 detects objects around the vehicle using the light receiving signal output from the light receiving section 20.

A mechanism for changing the areas U1, U2 and U3 will be described with reference to FIGS. 5, 6, 7 and 8. The distance measuring unit 200 has a first moving mechanism 50 and a second moving mechanism. The first moving mechanism 50 is a mechanism for moving the light receiving element array 22 in the horizontal direction HD, for example, the +X direction. In the present embodiment, the first moving mechanism 50 is used to move the usable area from the first area U1 to the second area U2 in the malfunction countermeasure mode. The second moving mechanism 70 is a mechanism for moving the light receiving element array 22 in the vertical direction VD, for example, the +Z direction. In the present embodiment, the second moving mechanism 70 is used to move the usable area from the first area U1 to the third area U3 in the malfunction detection mode.

Figure 5:
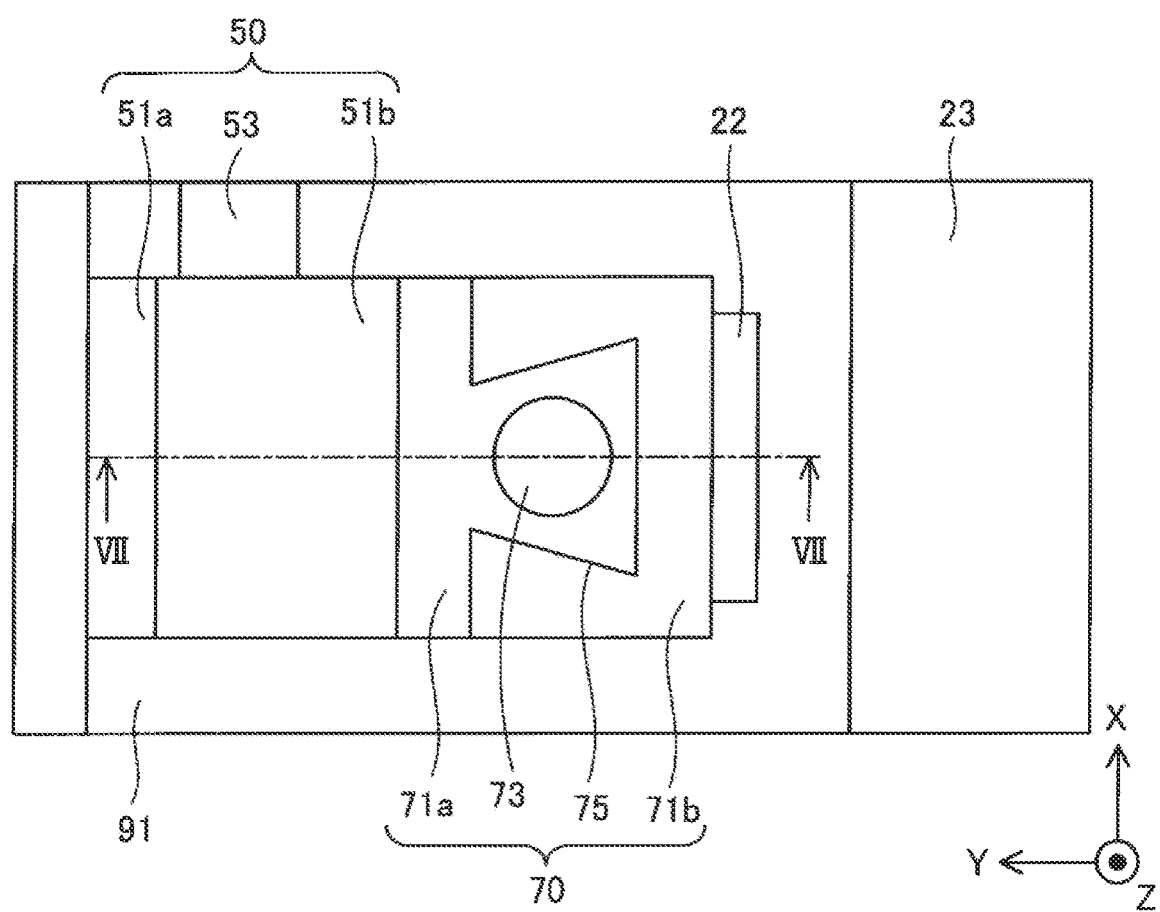
FIG. 5 is a top view of a first moving mechanism and a second moving mechanism.
Figure 6:
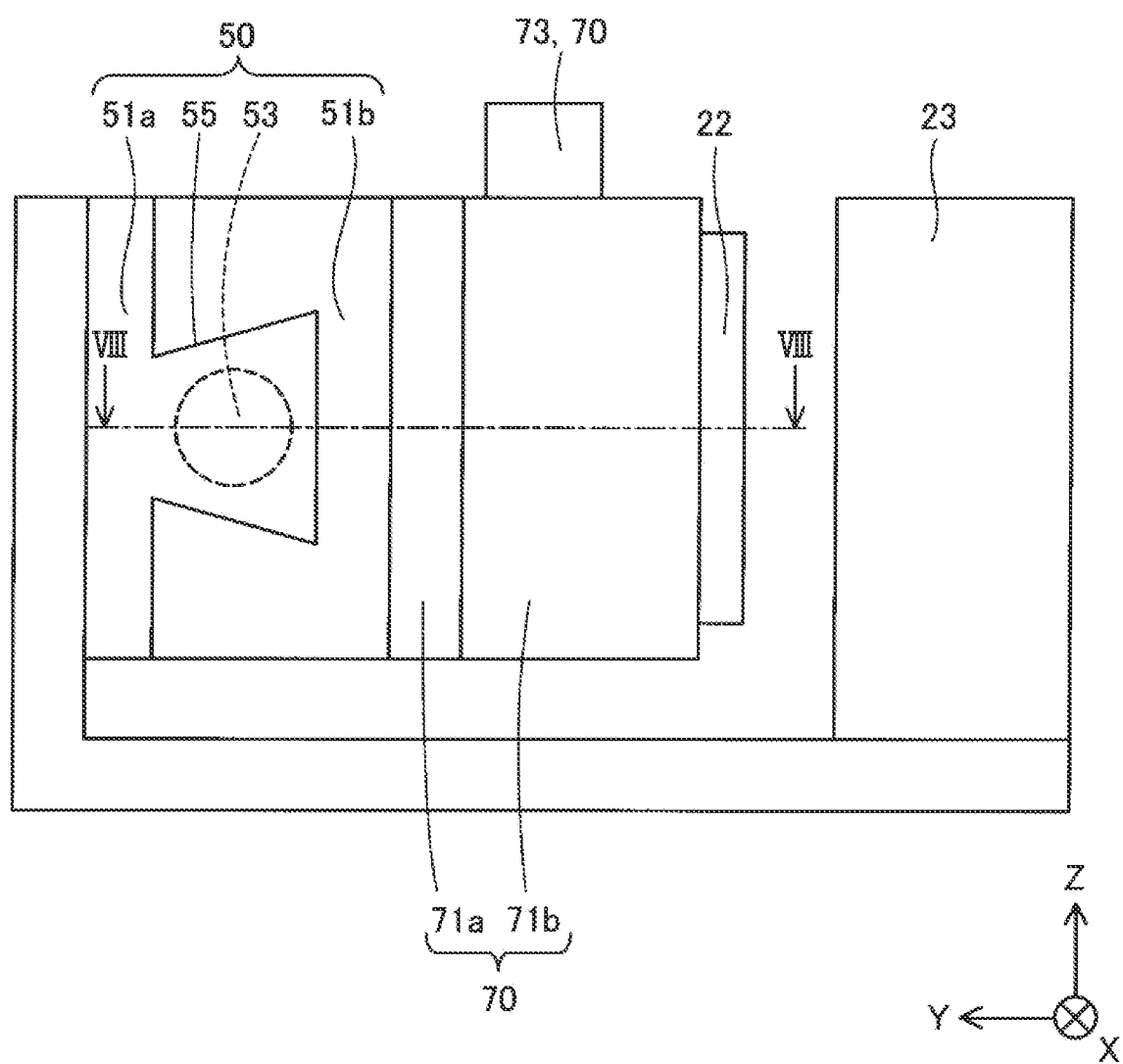
FIG. 6 is a side view of a first moving mechanism and a second moving mechanism.
Figure 7:
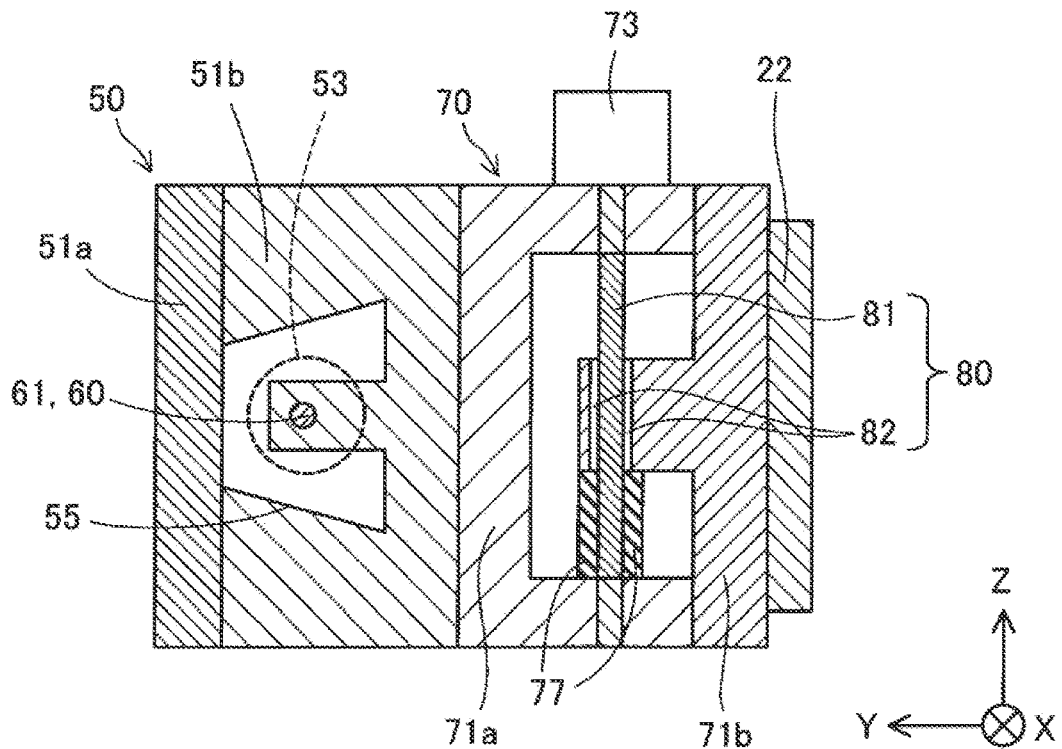
FIG. 7 is a cross-sectional view taken along line VII-VII in FIG. 5.
Figure 8:
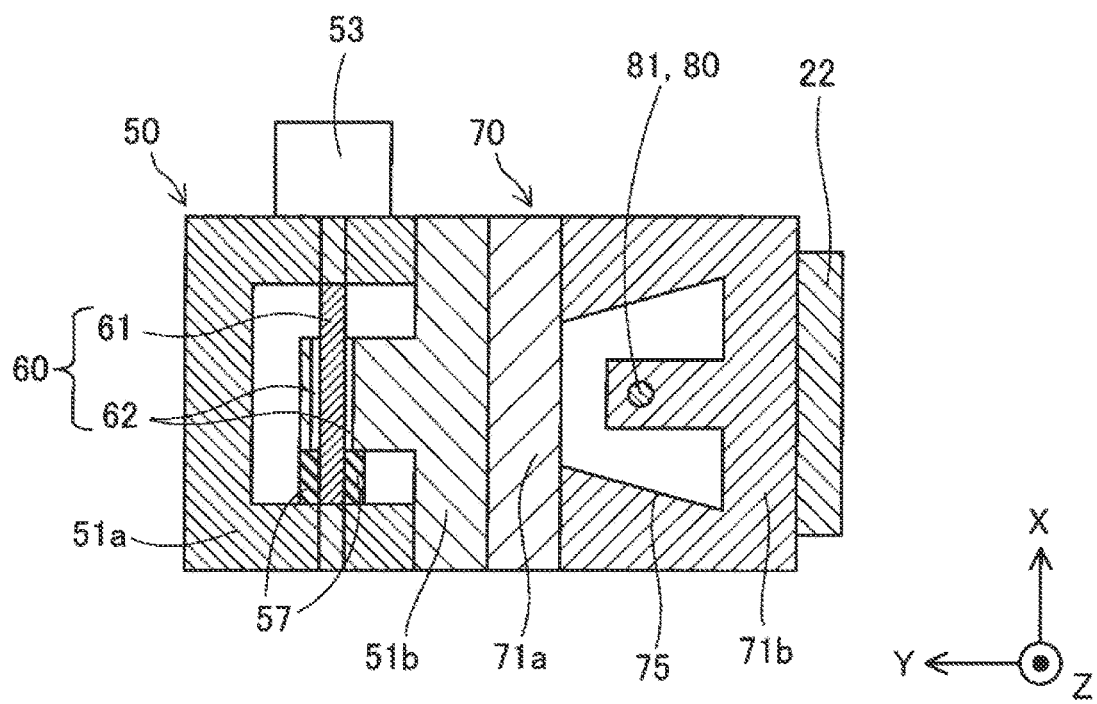
FIG. 8 is a cross-sectional view taken along line VIII-VIII of FIG. 6.

As shown in FIGS. 5 and 6, the first moving mechanism 50 and the second moving mechanism 70 are arranged in the order of the light receiving lens 23, the light receiving element array 22, the second moving mechanism 70, and the first moving mechanism 50 from the −Y direction side, and fixed to a base member 91. The light receiving element array 22 is attached to a surface on the −Y direction side of the second moving mechanism 70.

As shown in FIGS. 5, 6, 7 and 8, the first moving mechanism 50 includes a pair of first movable parts 51a and 51b, a motor 53, a guide 55, a screw mechanism 60, an elastic member 57. The first movable parts 51a and 51b are members for moving the light receiving element array 22 parallel to the light receiving lens 23 in the X direction. A surface in the −Y direction of the first movable part 51b is fixed to a surface in the +Y direction of the second moving mechanism 70. The first movable part 51b moves in the X direction when the screw mechanism 60 is driven. By moving the first movable part 51b in the X direction, the second moving mechanism 70 and the light receiving element array 22 move in the X direction in conjunction with the first movable part 51b.

The motor 53 is attached to the surface of the first movable part 51a on the +X direction side, and rotates the screw mechanism 60 according to a control signal from the control part 111. The guide 55 guides the movement of the first movable part 51b in the X direction while keeping the light receiving element array 22 and the light receiving lens 23 parallel in the X direction. As shown in FIG. 6, the guide 55 has a trapezoidal shape with a base on the −Y direction side, so that the light receiving element array 22 and the light receiving lens 23 can be prevented from rattling.

The screw mechanism 60 has a male thread 61 and a female thread 62. In normal mode, the male thread 61 and the female thread 62 are fitted. In the malfunction countermeasure mode, when the motor 53 rotates the male thread 61, a fitting state between the male thread 61 and the female thread 62 is relaxed, and the first movable part 51b moves in the X direction. At this time, the male thread 61 is rotated until the movement amount of the first movable part 51b reaches a predetermined movement amount. The predetermined movement amount is, for example, several millimeters.

The elastic member 57 covers an outer peripheral surface of the male thread 61 on the −X direction side. The elastic member 57 deforms (expands and contracts) in the X direction according to the driving state of the screw mechanism 60. The elastic member 57 is, for example, a compression coil spring, silicon rubber, or the like.

The second moving mechanism 70 has a configuration similar to that of the first moving mechanism 50. Specifically, as shown in FIGS. 5 to 8, the second moving mechanism 70 includes a pair of second movable parts 71a and 71b, a motor 73, a guide 75, a screw mechanism 80, and an elastic member 77.

The second movable parts 71a and 71b are members for moving the light receiving element array 22 parallel to the light receiving lens 23 in the Z direction. The second movable portion 71b moves in the Z direction when the screw mechanism 80 is driven. As the second movable portion 71b moves in the Z direction, the light receiving element array 22 moves in the Z direction in conjunction with the second movable portion 71b.

The motor 73 is attached to the surface of the second movable part 71a on the +X direction side, and rotates the screw mechanism 80 according to a control signal from the control part 111. The guide 75 guides the movement of the second movable portion 71b in the Z direction while keeping the light receiving element array 22 and the light receiving lens 23 parallel in the Z direction. Similar to the guide 55 of the first moving mechanism 50, the guide 75 has a trapezoidal shape with the base on the −Y direction side. Therefore, rattling of the light receiving element array 22 and the light receiving lens 23 can be suppressed.

The screw mechanism 80 has a male thread 81 and a female thread 82. In normal mode, the male thread 81 and the female thread 82 are fitted. In the malfunction countermeasure mode, when the motor 73 rotates the male thread 81, a fitting state between the male thread 81 and the female thread 82 is relaxed, and the second movable part 71b moves in the Z direction. At this time, the male thread 81 is rotated until the movement amount of the second movable part 71b reaches a predetermined movement amount. The predetermined movement amount is, for example, several millimeters.

The elastic member 77 covers an outer peripheral surface of the male thread 61 on the −X direction side. The elastic member 77 deforms (expands and contracts) in the Z direction according to the driving state of the screw mechanism 80. The elastic member 77 is, for example, a compression coil spring, silicon rubber, or the like.

Figure 9:
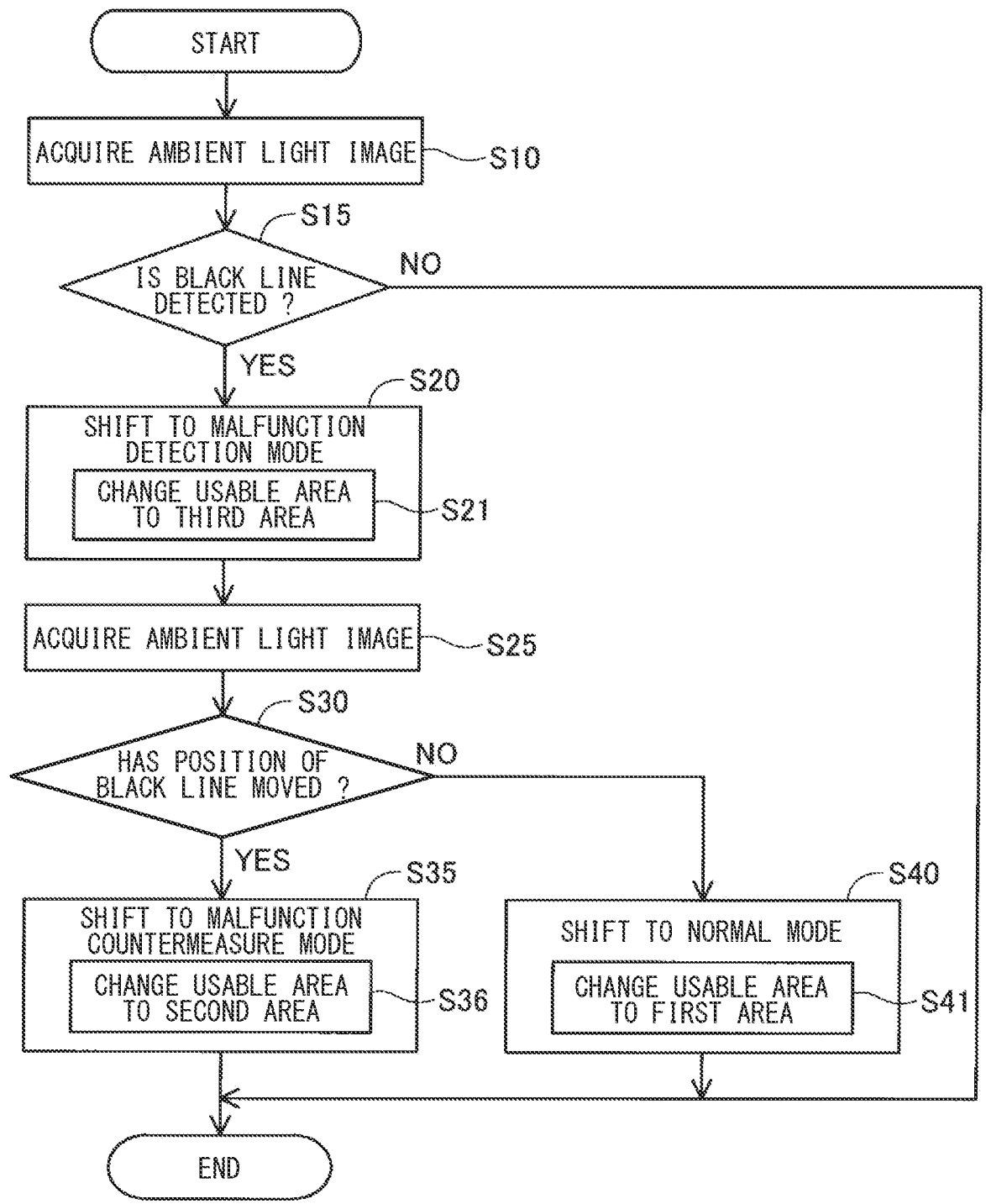
FIG. 9 is a flowchart showing a procedure of malfunction detection processing.

A2. Malfunction Detection Processing:

The failure detection processing shown in FIG. 9 is repeatedly executed at predetermined time intervals during the object detection processing performed by the object detection part 117. In step S10, the image acquisition part 115 acquires an ambient light image. Specifically, the image acquisition part 115 acquires an ambient light image using the first light receiving signal output by the light receiving process using the light receiving element 220 in the first area U1.

Figure 10:
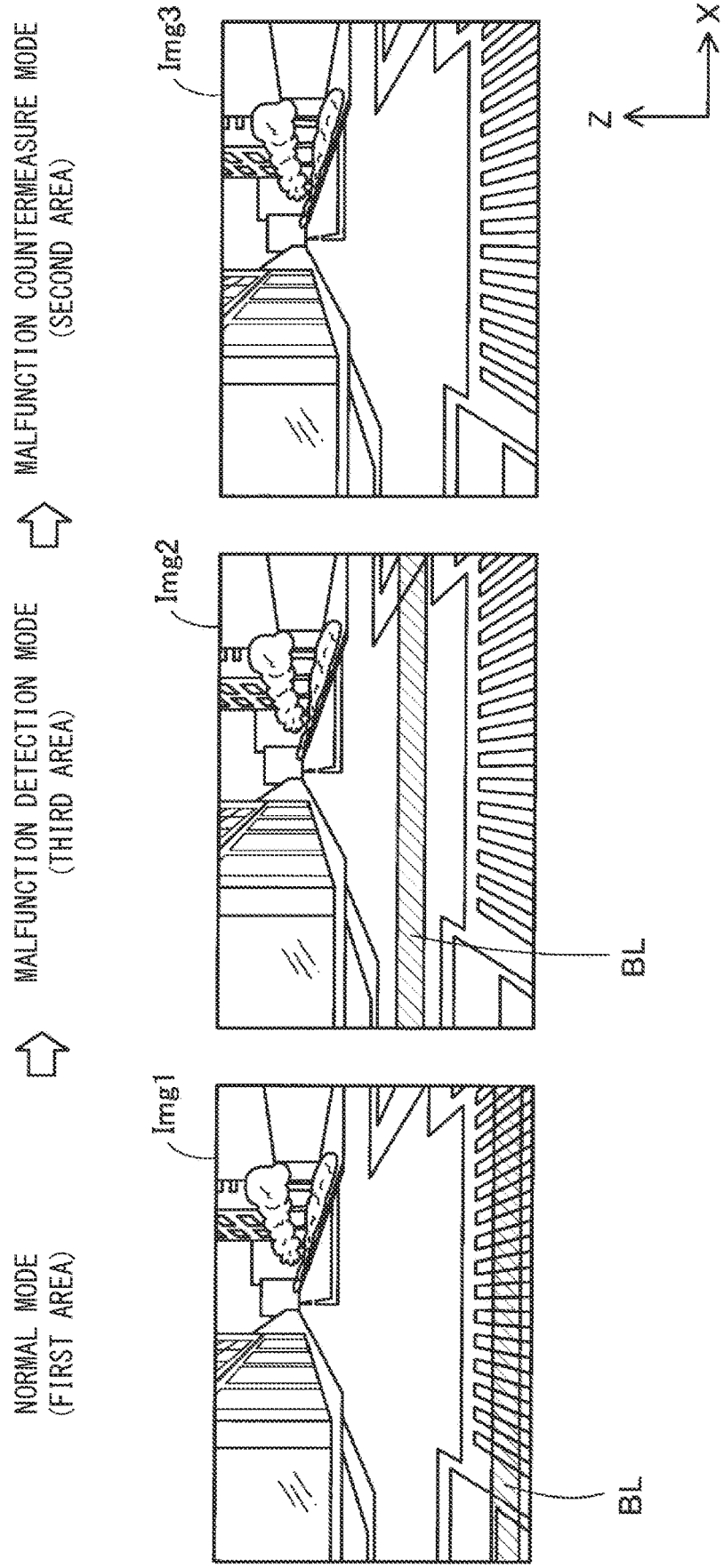
FIG. 10 is an explanatory diagram showing an example of an ambient light image acquired in each operation mode.
Figure 11:
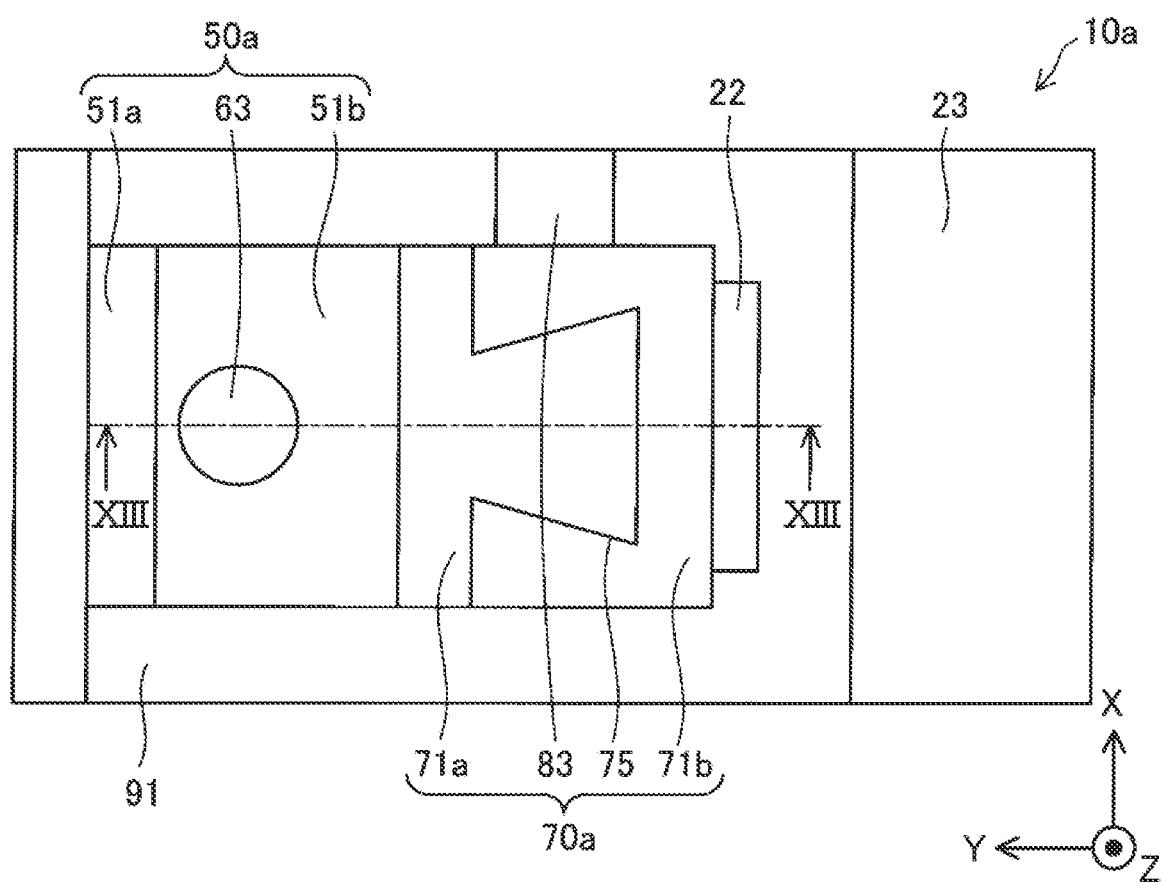
FIG. 11 is a top view of a first moving mechanism and a second moving mechanism in a second embodiment.
Figure 12:
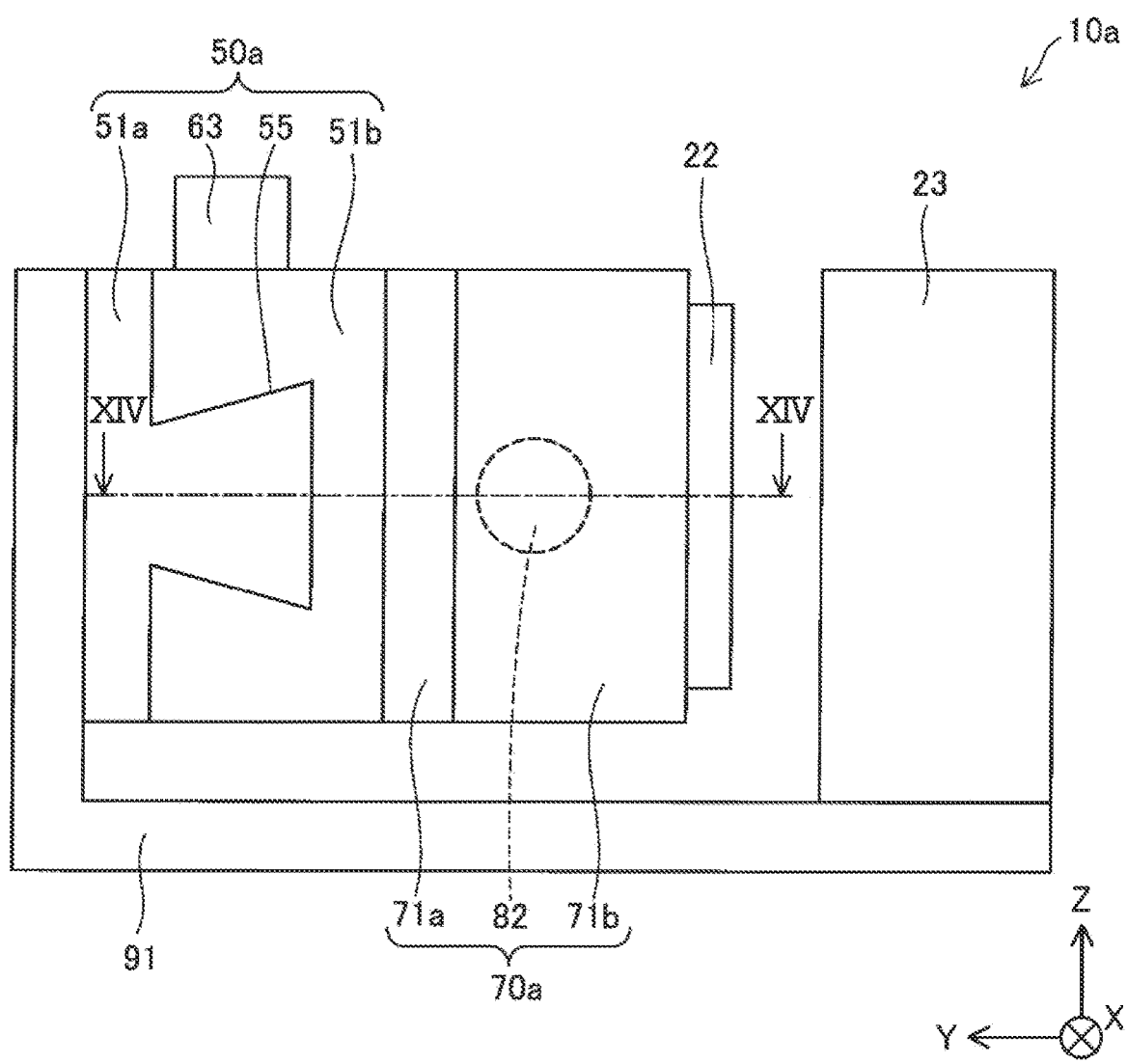
FIG. 12 is a side view of a first moving mechanism and a second moving mechanism in a second embodiment.
Figure 13:
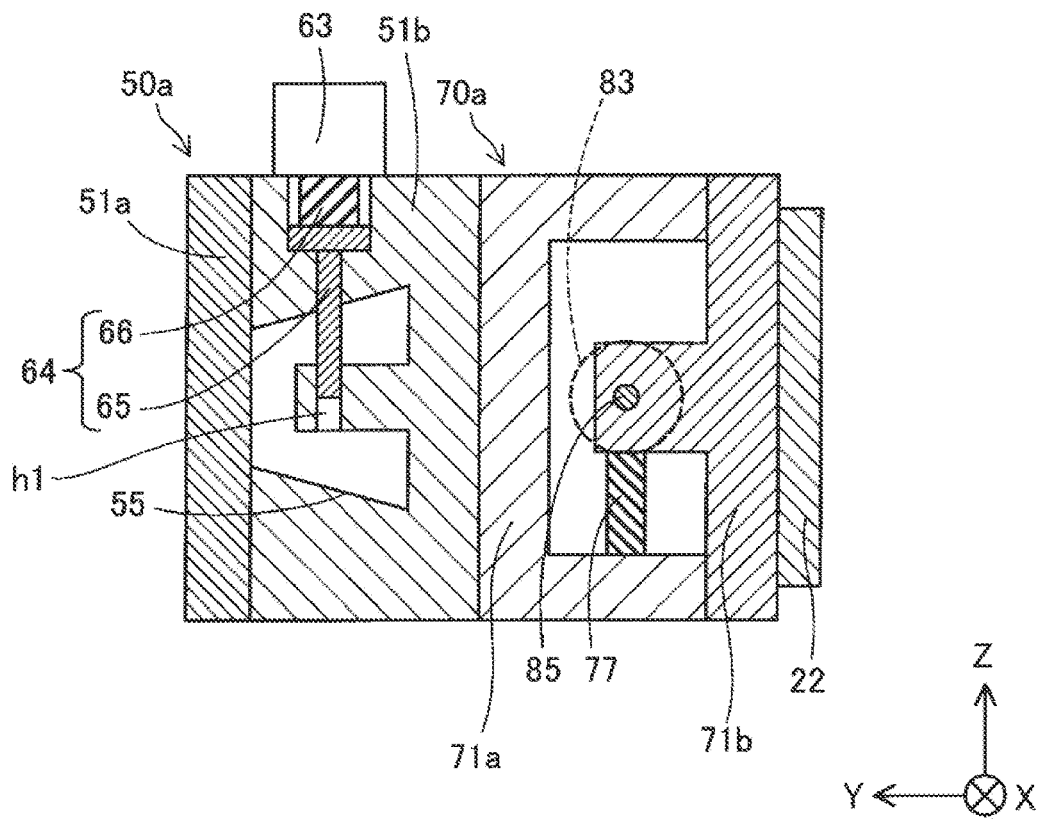
FIG. 13 is a cross-sectional view taken along line XIII-XIII in FIG. 11.
Figure 14:
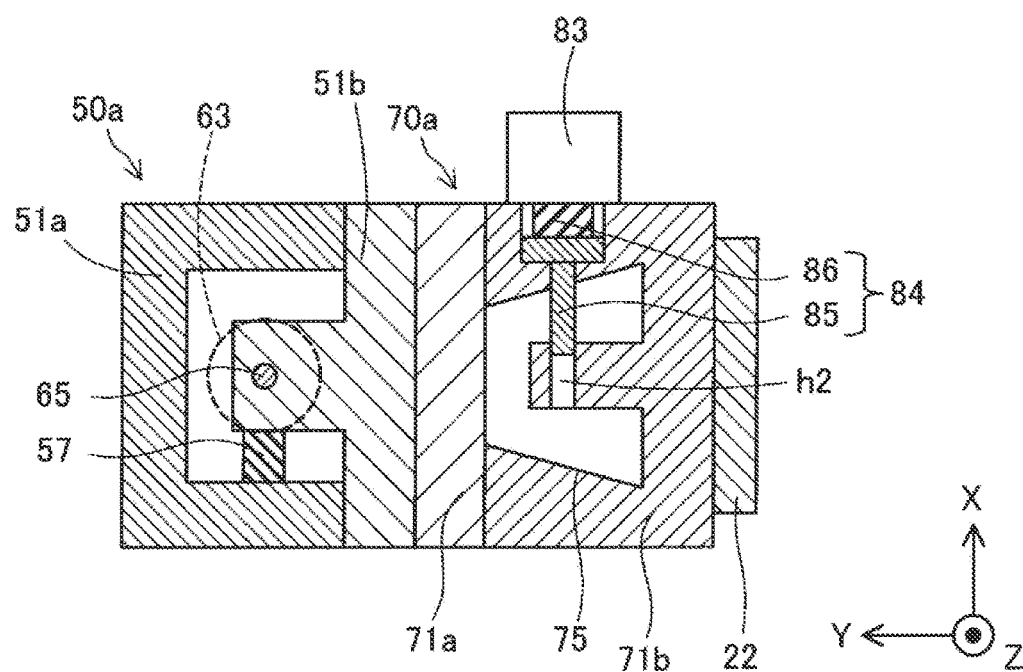
FIG. 14 is a cross-sectional view taken along line XIV-XIV of FIG. 12.

In step S15, the malfunction detection part 113 determines whether or not a black line is detected in the ambient light image. Specifically, the malfunction detection part 113 determines whether or not a black line BL along the X direction, that is, a dark line appears in the image data of the ambient light image Img1 in the normal mode shown on the left side of FIG. 10. More specifically, the malfunction detection part 113 determines whether or not a pixel group having a luminance value of 0 (zero) is arranged along the X direction in the image data of the ambient light image Img1, that is, whether or not there is a pixel row with a luminance value of 0 (zero) that forms one line in the scanning direction. The luminance value is not limited to 0 (zero), and may be a value less than or equal to the luminance value used as the reference value for low luminance.

When it is determined that the black line is detected in the ambient light image (step S15: YES), the malfunction detection part 113 determines that the light receiving element 220 in the first area U1 may be out of order. In step S20, the control part 111 shifts to the malfunction detection mode. Specifically, in step S21, the control part 111 controls the second moving mechanism 70 to change the usable area from the first area U1 to the third area U3. The control part 111 drives the motor 73 to rotationally drive the screw mechanism 80, thereby moving the second movable part 71b in the +Z direction or the −Z direction.

In step S25, the image acquisition part 115 acquires the ambient light image. Specifically, the image acquisition part 115 acquires an ambient light image using the third light receiving signal output by the light receiving process using the light receiving element 220 in the third area U3.

In step S30, the malfunction detection part 113 determines whether or not the position of the black line detected in step S15 has moved. Specifically, in the image data of the ambient light image Img2 in the malfunction detection mode shown in the center of FIG. 10, the malfunction detection part 113 determines whether or not the BL position of the black line has moved in the +Z direction side or −Z direction side, accompanying the change of the usable area from the first area U1 to the third area U3. That is, in the image data of the ambient light image Img2, the malfunction detection part 113 determines whether or not the pixel group with a luminance value of 0 (zero) detected in step S15 described above moves to a pixel position in the +Z direction or a pixel position in the −Z direction with respect to the pixel position in the image data of the ambient light image Img1.

When it is determined that the position of the black line has moved (step S30: YES), the malfunction detection part 113 determines that the light receiving element 220 in the first area U1 is out of order. In step 35, the control part 111 shifts to the malfunction countermeasure mode. Specifically, in step S36, the control part 111 controls the first moving mechanism 50 and the second moving mechanism 70 to change the usable area from the third area U3 to the second area U2. More specifically, the control part 111 drives the motor 73 of the second moving mechanism 70 to rotationally drive the screw mechanism 80, thereby moving the second movable part 71b in the −Z direction, thereby returning the usable area from the third area U3 to the first area U1. Next, the control part 111 drives the motor 53 of the first moving mechanism 50 to rotationally drive the screw mechanism 60, thereby moving the first movable part 51b in the +X direction and moving the usable area from the first area U1 to the second area U2. As a result, the black line BL is no longer detected in the image data of the ambient light image Img3 in the malfunction countermeasure mode shown on the right side of FIG. 10. After that, in the object detection processing executed by the object detection part 117, the light receiving element 220 within the second area U2 is used.

When it is determined that the position of the black line has not moved (step S30: NO), the malfunction detection part 113 determines that the light receiving element 220 in the first area U1 is not out of order. In step 40, the control part 111 shifts to the normal mode. Specifically, in step S41, the control part 111 controls the second moving mechanism 70 to move the second movable part 71b in the −Z direction, thereby returning the usable area from the third area U3 to the first area U1. After that, in the object detection processing executed by the object detection part 117, the light receiving element 220 within the first area U1 is used.

When it is determined in step S15 that no black line has been detected (step S15: NO), after execution of step S36, or after execution of step S41, the malfunction detection processing ends.

According to the object detection device 10 of the first embodiment having the configuration described above, an ambient light image Img1 is obtained using the first light receiving signal corresponding to the light receiving state of the light receiving elements in the first area U1 in the light receiving element array 22 in which the plurality of light receiving elements 220 are arranged in a plane. Since the malfunction of the light receiving element 220 in the first area U1 is detected using the acquired ambient light image Img1, the load on the object detection device 10 can be reduced and the malfunction of the light receiving element 220 can be accurately detected. Specifically, according to the object detection device 10, in detecting a malfunction of the light receiving element 220, it is not necessary to store the ambient light image acquired in the past in the memory 103. Therefore, the storage capacity used in the memory 103 is can be suppressed. Further, since the image data of the ambient light image is not compared with the image data of the ambient light image acquired in the past for each pixel, the load on the CPU 110 can be reduced and the presence or absence of malfunction can be detected with high accuracy.

When the malfunction of the light receiving element 220 in the first area U1 is detected, the object is detected using the second light receiving signal corresponding to the light receiving state of the light receiving element 220 in the second area U2. An object can be detected using a light receiving element 220 in which a malfunction is not detected. Therefore, the object can be detected with high accuracy.

In the image data of the ambient light image Img1, when a pixel group having a brightness value equal to or less than a predetermined value is arranged along the X direction, it is detected that there is possibility that the light receiving element 220 in the first area U1 is out of order. Therefore, it is possible to easily detect the possibility that the light receiving element 220 in the first area U1 is out of order.

When it is detected that there is possibility that the light receiving element 220 in the first area U1 is out of order, the ambient light image Img2 is acquired again using the third light receiving signal corresponding to the light receiving state of the light receiving element 220 in the third area U3. When the pixel group whose brightness value is equal to or less than a predetermined value moves in the +Z direction with respect to an original pixel position as the usable area moves from the first area U1 to the third area U3 in the image data of the ambient light image Img2 that has been acquired again, the light receiving element 220 in the first area U1 is detected to be out of order. Therefore, malfunction of the light receiving element 220 in the first area U1 can be easily detected.

The first moving mechanism 50 has the first movable parts 51a and 51b that move the light receiving element array 22 along the X direction by driving the screw mechanism 60 by the motor 53, so that the light receiving element array 22 can be moved along the X direction with a simple configuration. The second moving mechanism 70 has the second movable parts 71a and 71b that move the light receiving element array 22 along the Z direction by driving the screw mechanism 80 by the motor 73, so that the light receiving element array 22 can be moved along the Z direction with a simple configuration. Instead of a configuration in which the light receiving element array 22 is mechanically moved to move the first area U1, or by mechanically driving the optical system including the light receiving lens 23 together with the above configuration, a configuration for changing the first area U1, that is the focal area, on the light receiving element array 22 may be provided. This is because the focal area and focal position in the light receiving element array 22 are determined by the relative positional relationship between the light receiving lens 23 and the light receiving element array 22.

B. Second Embodiment

Below, the same reference numerals are used for the same configurations as in the above-described embodiment, and the description thereof is omitted. As shown in FIGS. 11, 12, 13, and 14, the object detection device 10a of the second embodiment includes a first moving mechanism 50a instead of the first moving mechanism 50, and a second moving mechanism 70a instead of the second moving mechanism 70, and in this respect, the object detection device 10a differs from the object detection device 10 of the first embodiment.

The first moving mechanism 50a differs from the first moving mechanism 50 of the first embodiment in that the motor 53 and the screw mechanism 60 are omitted and in that a lock mechanism 64 and an electromagnet 63 are provided.

The lock mechanism 64 restricts a movement of the first movable parts 51a and 51b in the X direction. In accordance with the start and the stop of energization of the electromagnet 63, the lock mechanism 64 switches between "locked state" in which the first movable parts 51a and 51b cannot move in the X direction and "released state" in which the first movable parts 51a and 51b can move in the X direction. The lock mechanism 64 has a lock pin 65 and a spring member 66. The lock pin 65 is positioned on the −Z direction side of the spring member 66 in the first movable parts 51b and is in contact with the spring member 66. In the locked state, the lock pin 65 is biased in the −Z direction by the spring member 66, and the tip of the lock pin 65 is fixed at a predetermined position within the through hole h1 in the first movable part 51b. The spring member 66 is arranged on the −Z direction side of the electromagnet 63 in the first movable part 51b. The spring member 66 controls movement of the lock pin 65 in the Z direction by magnetic force generated as the electromagnet 63 is energized.

The electromagnet 63 is arranged on a surface in the +Z direction of the first movable part 51b. The electromagnet 63 generates magnetic force when energization is started, and disappears when energization is stopped. That is, by controlling the energization of the electromagnet 63, the polarity of the electromagnet 63 can be changed and the disappearance of the magnetic field can be adjusted. The magnetized electromagnet 63 exerts its magnetic force on the spring member 66 to control the movement of the lock pin 65 in and out of the through hole h1. That is, the electromagnet 63 functions as a driving portion of the lock mechanism 64. The start and stop of energization of the electromagnet 63 are controlled by the control part 111.

The second moving mechanism 70a differs from the second moving mechanism 70 of the first embodiment in that the motor 73 and the screw mechanism 80 are omitted and in that the lock mechanism 84 and the electromagnet 83 are provided.

The lock mechanism 84 restricts a movement of the second movable parts 71a and 71b in the Z direction. In accordance with the start and the stop of energization of the electromagnet 83, the lock mechanism 84 switches between "locked state" in which the second movable parts 71a and 71b cannot move in the Z direction and "released state" in which the second movable parts 71a and 71b can move in the Z direction. The lock mechanism 84 includes a lock pin 85 and a spring member 86, like the lock mechanism 64 of the first moving mechanism 50a. The lock pin 85 is positioned on the −X direction side of the spring member 86 in the second movable portion 71b and is in contact with the spring member 86. In the locked state, the lock pin 85 is biased in the −X direction by the spring member 86, and the tip of the lock pin 85 is fixed at a predetermined position within the through hole h2 in the second movable portion 71b. The spring member 86 is arranged on the −X direction side of the electromagnet 83 in the second movable portion 71b. The spring member 86 controls movement of the lock pin 85 in the X direction by a magnetic force that accompanies energization of the electromagnet 83.

The electromagnet 83 is arranged on a surface in the +X direction of the second movable part 71b. As with the electromagnet 63 of the first moving mechanism 50a, the electromagnet 83 generates magnetic force when energization is started, and disappears when energization is stopped. The magnetized electromagnet 83 exerts its magnetic force on the spring member 86 to control the movement of the lock pin 85 in and out of the through hole h2.

Figure 15:
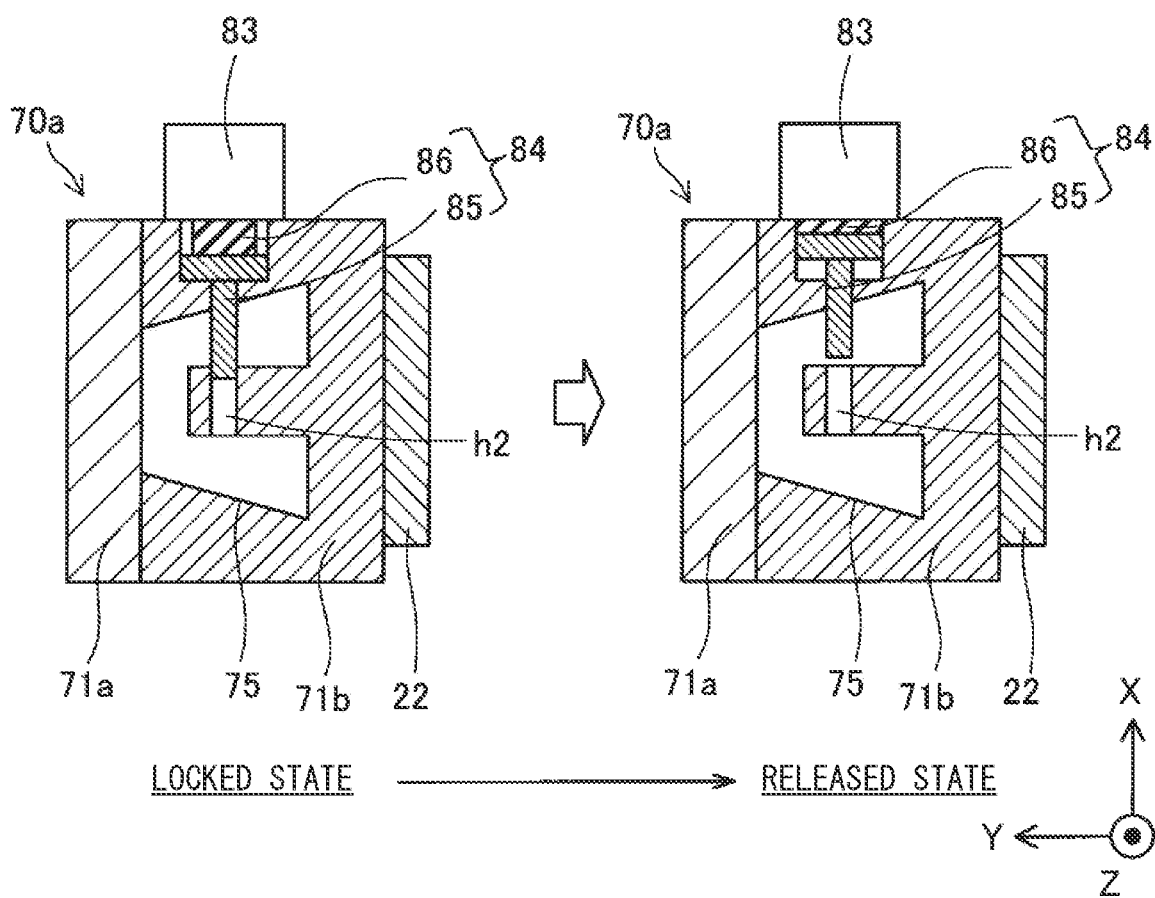
FIG. 15 is an explanatory diagram schematically showing how a second movable part moves.

A procedure for moving the light receiving element array 22 in the +Z direction in the second moving mechanism 70a will be described with reference to FIGS. 15 and 16. FIG. 15 corresponds to FIG. 14, and FIG. 16 corresponds to FIG. 13. In the locked state shown on the left side of FIG. 15, the energization of the electromagnet 83 is stopped, and the tip of the lock pin 85 (the end in the −Z direction) is fixed within the through hole h2 due to the biasing force of the spring member 86 in the −Z direction. Therefore, the movement of the second movable part 71b in the Z direction is restricted, and the light receiving element array 22 is fixed at a predetermined position in the normal mode. When the electromagnet 83 is energized, the electromagnet 83 is excited, and the lock pin 85 is attracted toward the electromagnet 83 (+Z direction) by the magnetic force of the electromagnet 83. As a result, as shown on the right side of FIG. 15, the tip of the lock pin 85 is extracted from the through hole h2, and the locked state is released to become the released state.

Figure 16:
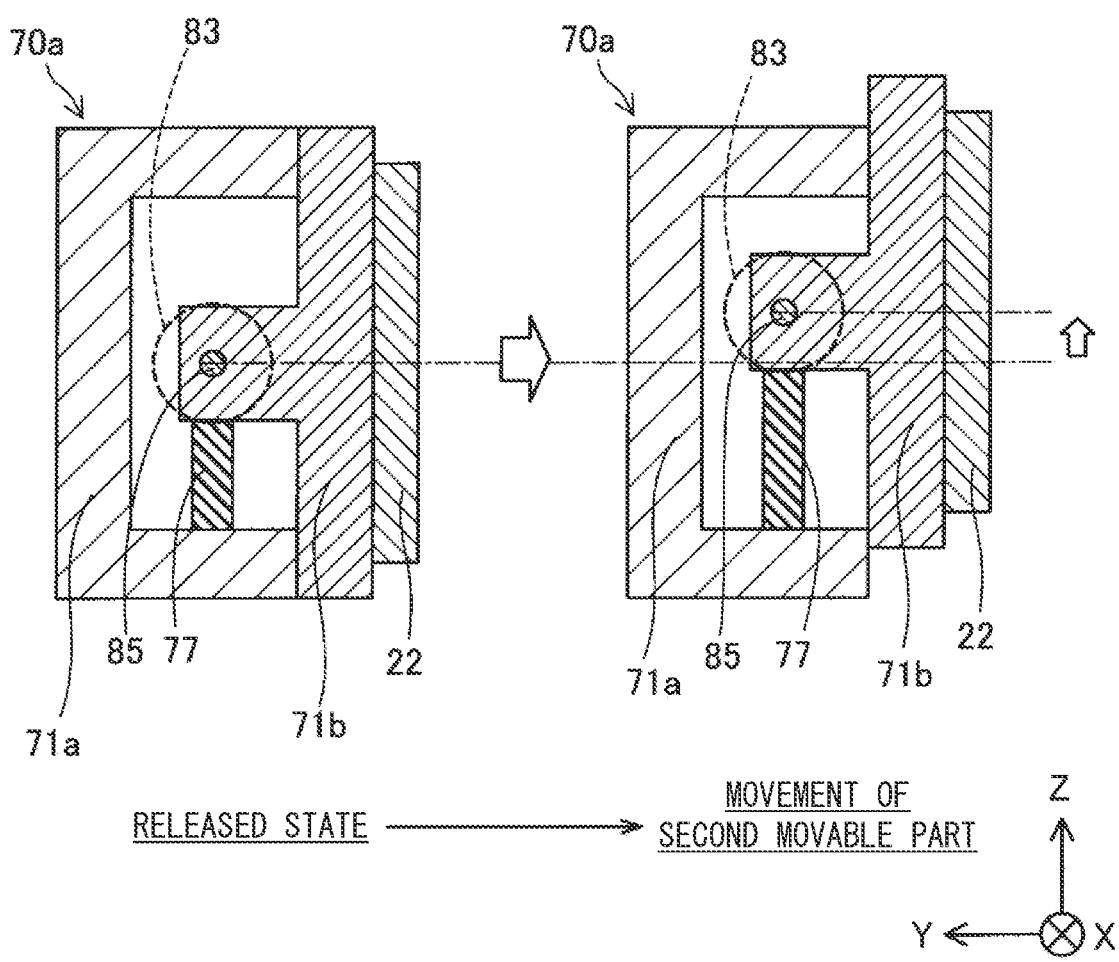
FIG. 16 is an explanatory diagram schematically showing how a second movable part moves.

As shown on the left side of FIG. 16, when the locked state is released, the biasing force of the elastic member 77 in the −Z direction weakens and the elastic member 77 extends in the +Z direction. As a result, the second movable portion 71b moves in the +Z direction as shown on the right side of FIG. 16, and the central position of the light receiving element array 22 in the Z direction moves in the +Z direction as shown by the dashed line.

Figure 17:
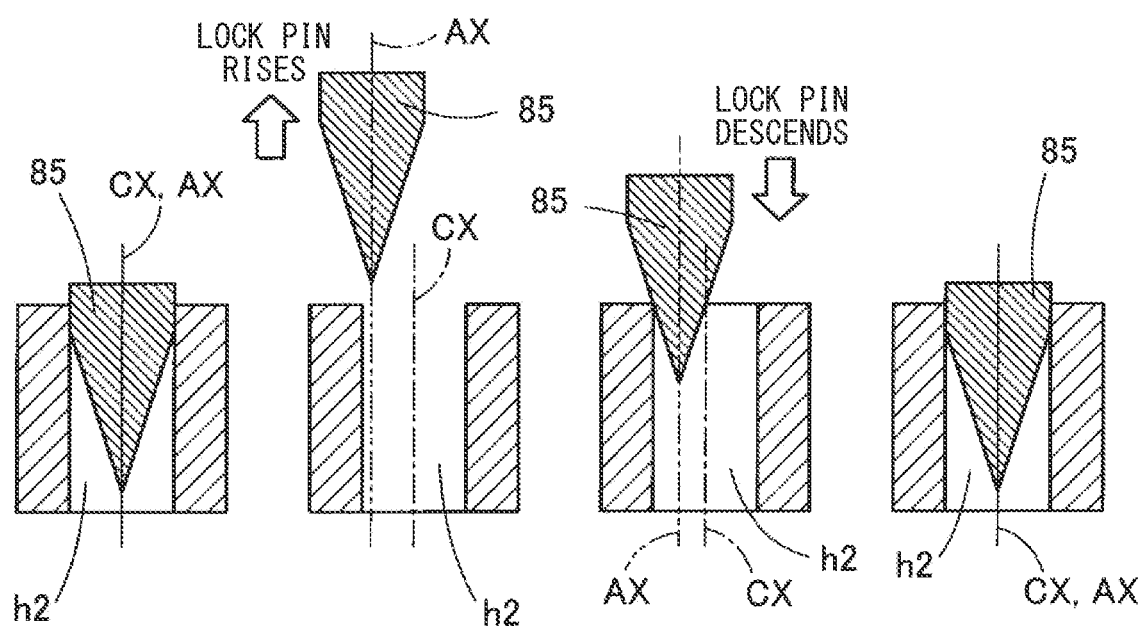
FIG. 17 is an explanatory view schematically showing how a lock pin moves.
Figure 18:
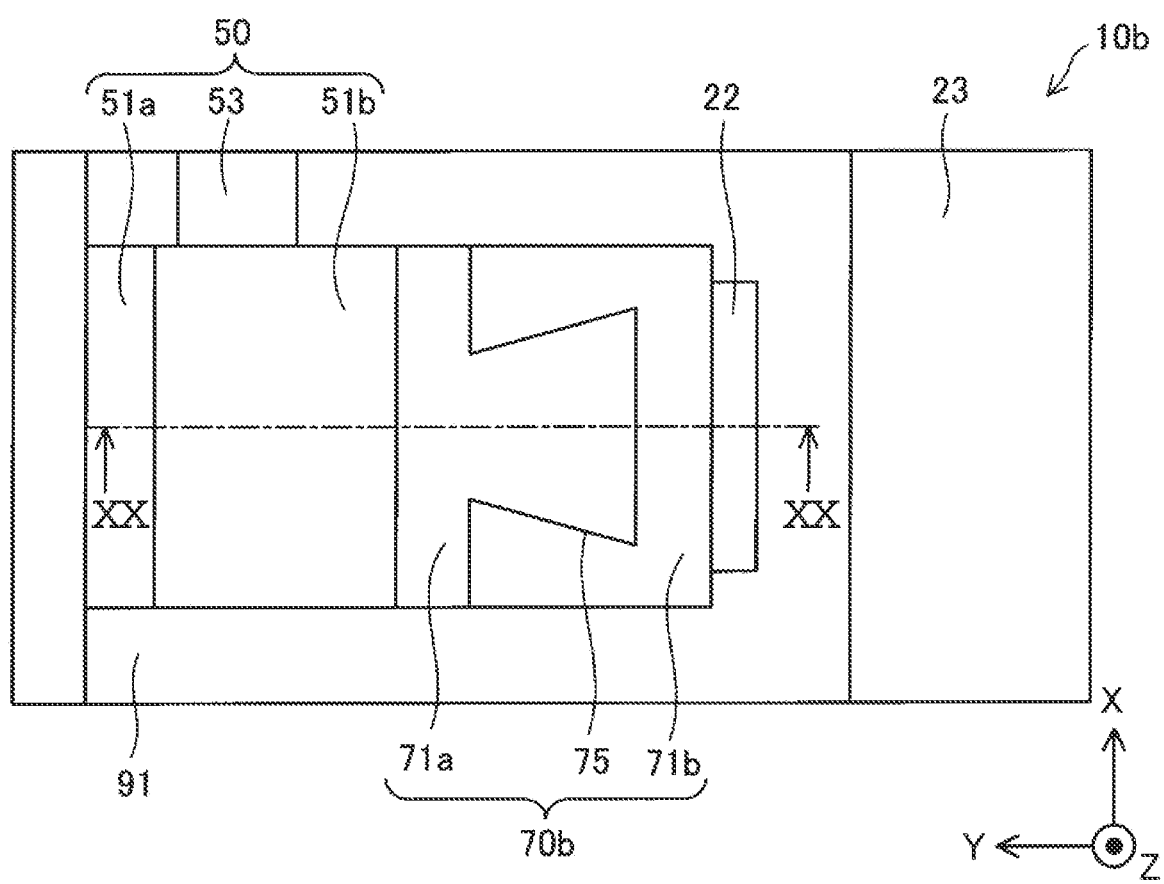
FIG. 18 is a top view of a first moving mechanism and a second moving mechanism in a third embodiment.
Figure 19:
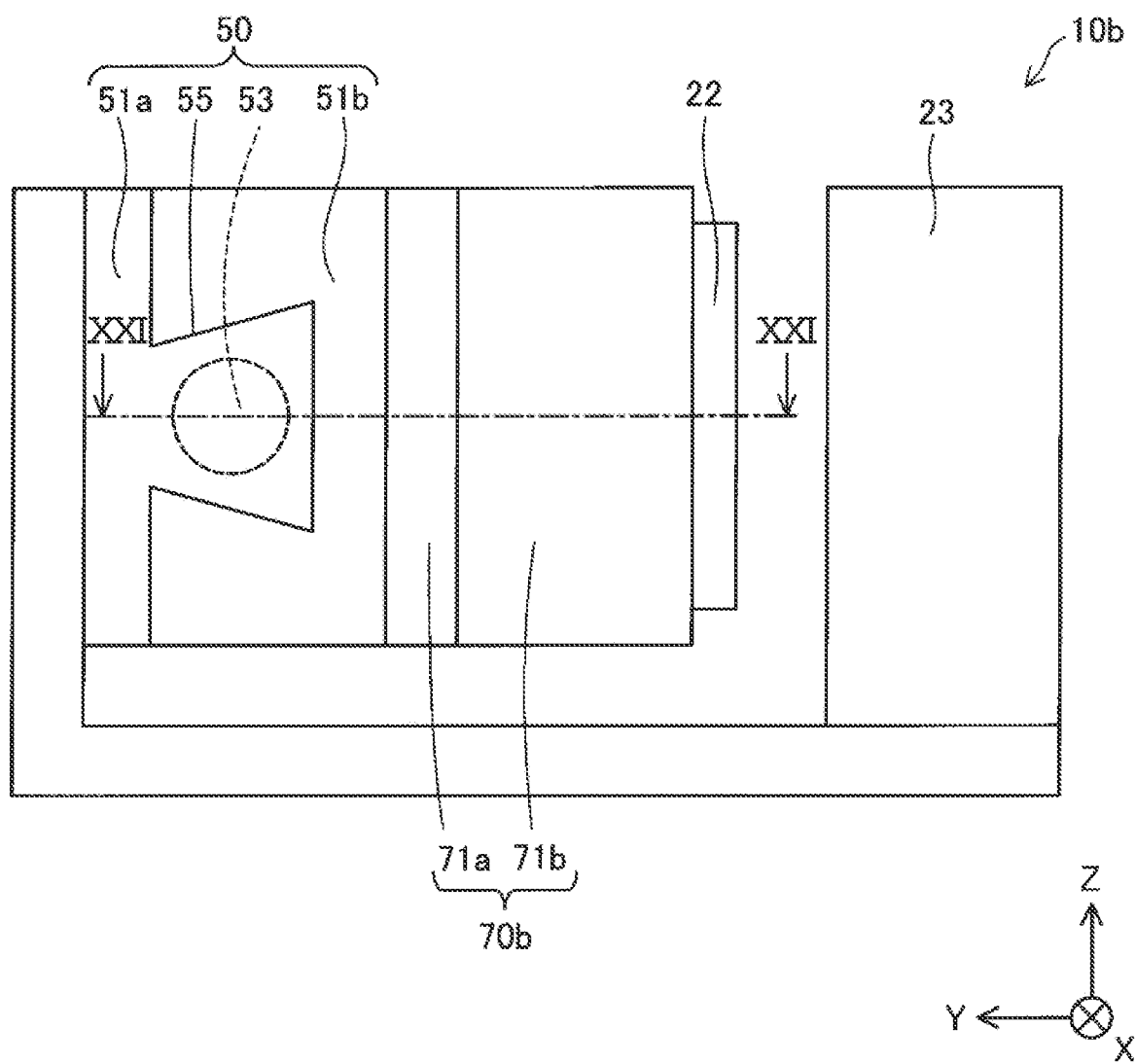
FIG. 19 is a side view of a first moving mechanism and a second moving mechanism in a third embodiment.
Figure 20:
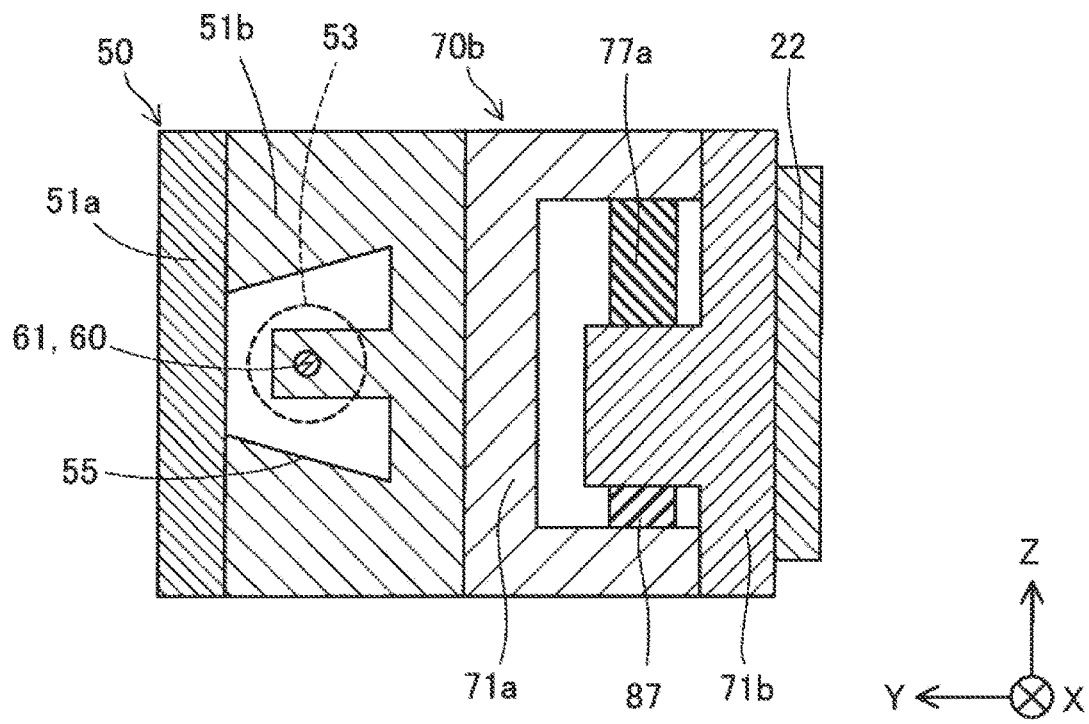
FIG. 20 is a cross-sectional view taken along line XX-XX of FIG. 18.
Figure 21:
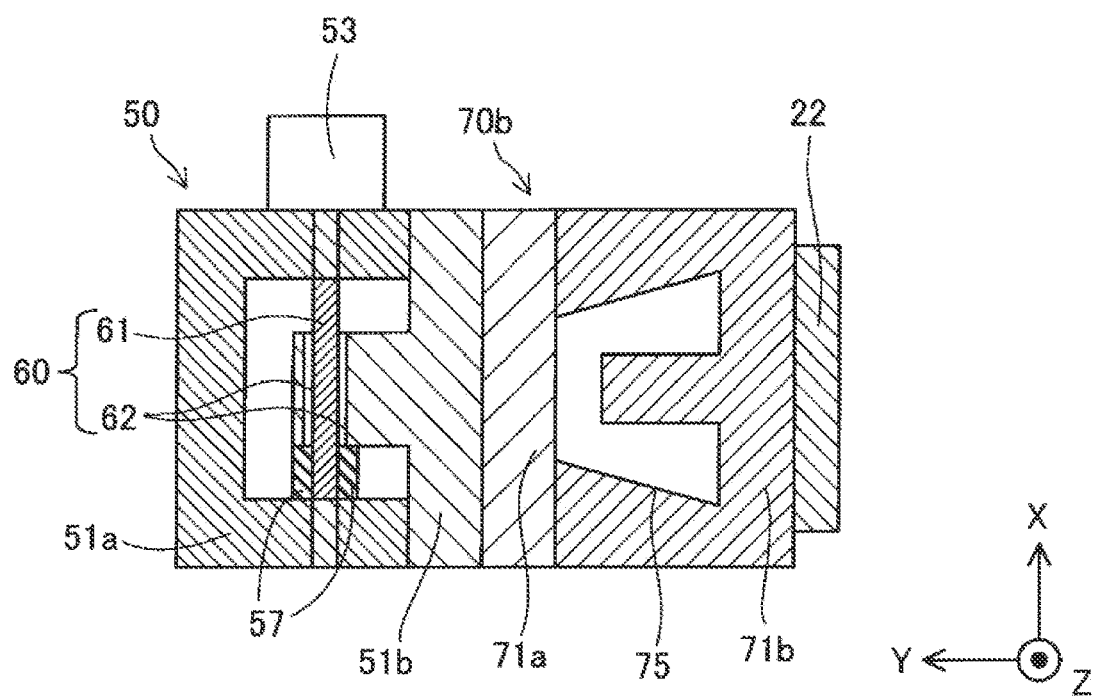
FIG. 21 is a cross-sectional view taken along line XXI-XXI of FIG. 19.

The operation of the lock pin 85 when shifting from the locked state to the released state and the operation of the lock pin 85 when shifting from the released state to the locked state will be described with reference to FIG. 17. FIG. 17 corresponds to FIG. 15 and shows an enlarged view of the vicinity of the through hole h2. In FIG. 17, an axis CX indicated by the dashed line is the central axis of the through hole h2 in the Y direction, and an axis AX indicated by the chain double-dashed line is the central axis of the lock pin 85 in the Y direction. In the locked state shown in the leftmost diagram of FIG. 17, the lock pin 85 is fixed at a predetermined position within the through hole h2 with its axis CX aligned with the axis AX of the through hole h2.

As shown in the leftmost diagram of FIG. 17 and the second diagram from the left of FIG. 17, when shifting from the locked state to the released state, the lock pin 85 rises to the side (+X direction) where the electromagnet 83 is arranged. As a result, the second movable part 71b becomes movable in the +Z direction, and the position of the through hole h2 also moves along with the movement of the second movable part 71b. Therefore, the axis AX of the lock pin 85 is shifted from the axis CX of the through hole h2 by the amount of movement of the second movable part 71b. After that, as shown in the third diagram from the left and the rightmost diagram of FIG. 17, when shifting from the released state to the locked state, the lock pin 85 descends toward the through hole h2 and the tip of the lock pin 85 is inserted into the through hole h2. At this time, since the second movable part 71b is returned to its original position, the position of the axis CX of the lock pin 85 is returned to its original position and coincides with the axis AX of the through hole h2.

As shown in FIG. 17, the tip of the lock pin 85 is tapered. Therefore, the lock pin 85 can be easily inserted into the through hole h2, and the lock pin 85 can be more firmly fixed to the through hole h2. Although the lock pin 85 is inserted into the through hole h2 along the axis AX of the through hole h2 in the example shown in FIG. 17, it may be inserted in a direction intersecting the axis AX. By configuring like this, it is possible to prevent the lock pin 85 from slipping out of the through hole h2 due to vehicle vibration or the like.

According to the object detection device 10a of the second embodiment having the above configurations, the first moving mechanism 50a includes the lock mechanism 64 that regulates the movement of the light receiving element array 22 in the X direction, the electromagnet 63 that controls switching between the locked state and the released state of the lock mechanism 64, and the first movable parts 51a and 51b that move the light receiving element array 22 along the X direction when the lock mechanism 64 is brought into the released state. Therefore, the structure of the first moving mechanism can be made simpler. The second moving mechanism 70a includes the lock mechanism 84 that regulates the movement of the light receiving element array 22 in the Z direction, the electromagnet 83 that controls switching between the locked state and the released state of the lock mechanism 84, and the second movable parts 71a and 71b that move the light receiving element array 22 along the Z direction when the lock mechanism 84 is brought into the released state. Therefore, the structure of the second moving mechanism 70a can be made simpler.

C. Third Embodiment

As shown in FIGS. 18, 19, 20 and 21, the object detection device 10b of the third embodiment has a second moving mechanism 70b instead of the second moving mechanism 70, and in this respect, the object detection device 10b differs from the object detection device 10 of the first embodiment.

The second moving mechanism 70b omits the motor 73 and the screw mechanism 80, has a piezoelectric body 87, and has an elastic member 77a instead of the elastic member 77. In this respect, the second moving mechanism 70b differs from the second moving mechanism 70.

The piezoelectric body 87 is a member made of a material having a piezoelectric effect, such as a piezoelectric element, and deforms according to a voltage applied to an electrode (not shown). The voltage application to the piezoelectric body 87 is controlled by the control part 111, and the voltage is applied when switching the operation mode described above. The elastic member 77a is arranged between the surface in the −Z direction of the second movable part 71a and the surface in the +Z direction of the second movable part 71b.

Figure 22:
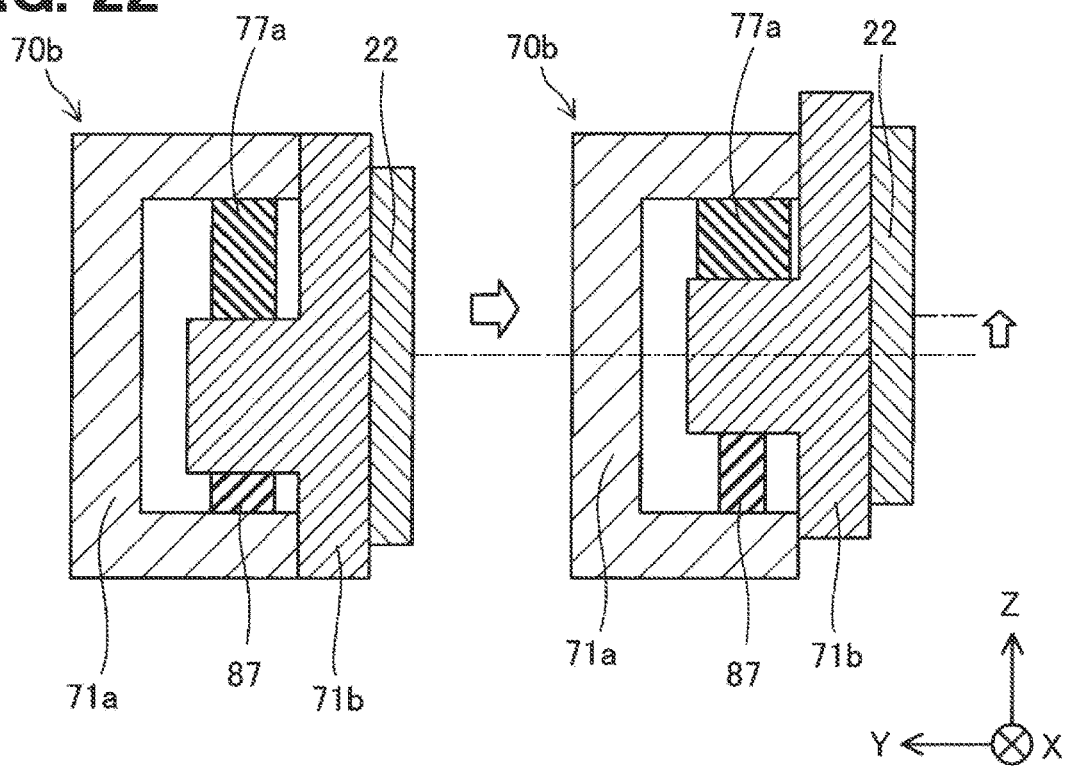
FIG. 22 is an explanatory diagram schematically showing how a second movable part moves.
Figure 23:
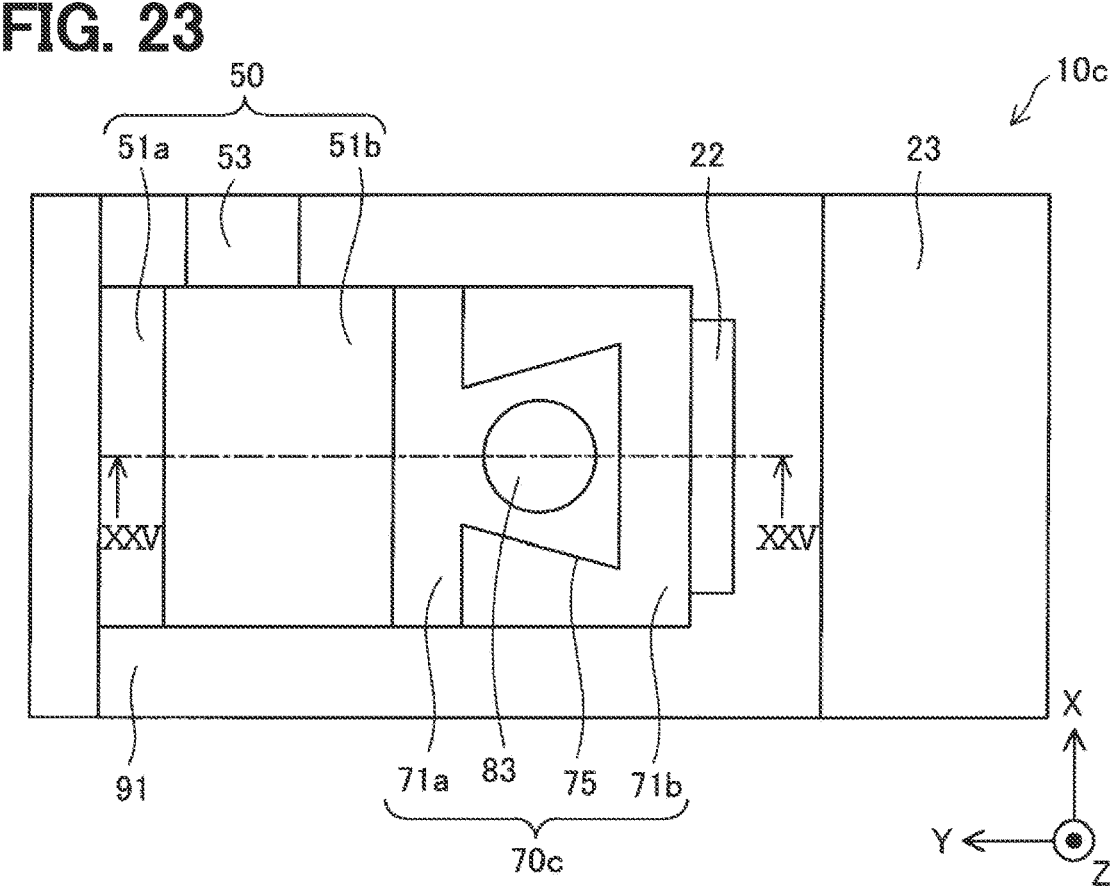
FIG. 23 is a top view of a first moving mechanism and a second moving mechanism in a fourth embodiment.
Figure 24:
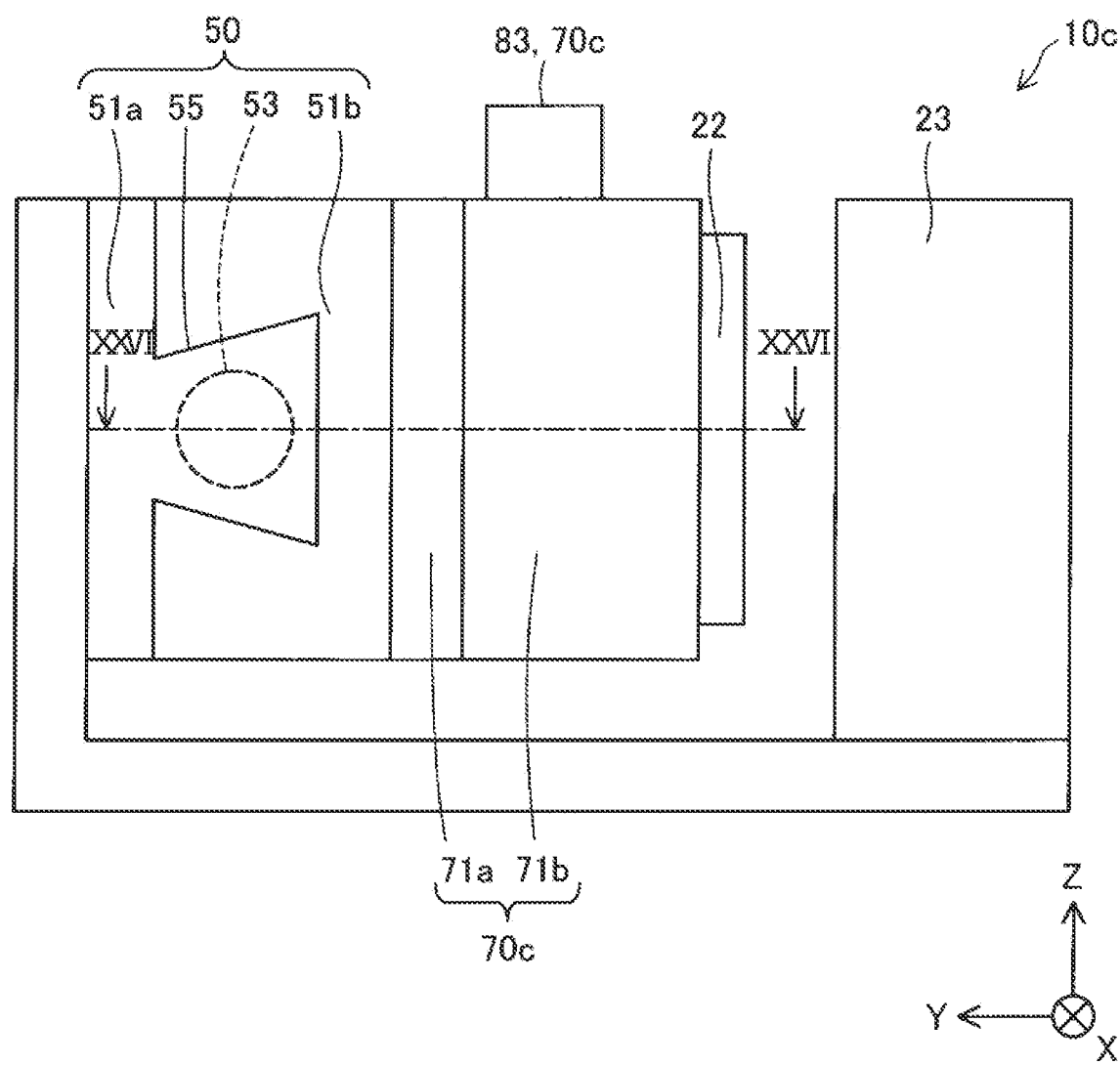
FIG. 24 is a side view of a first moving mechanism and a second moving mechanism in a fourth embodiment.
Figure 25:
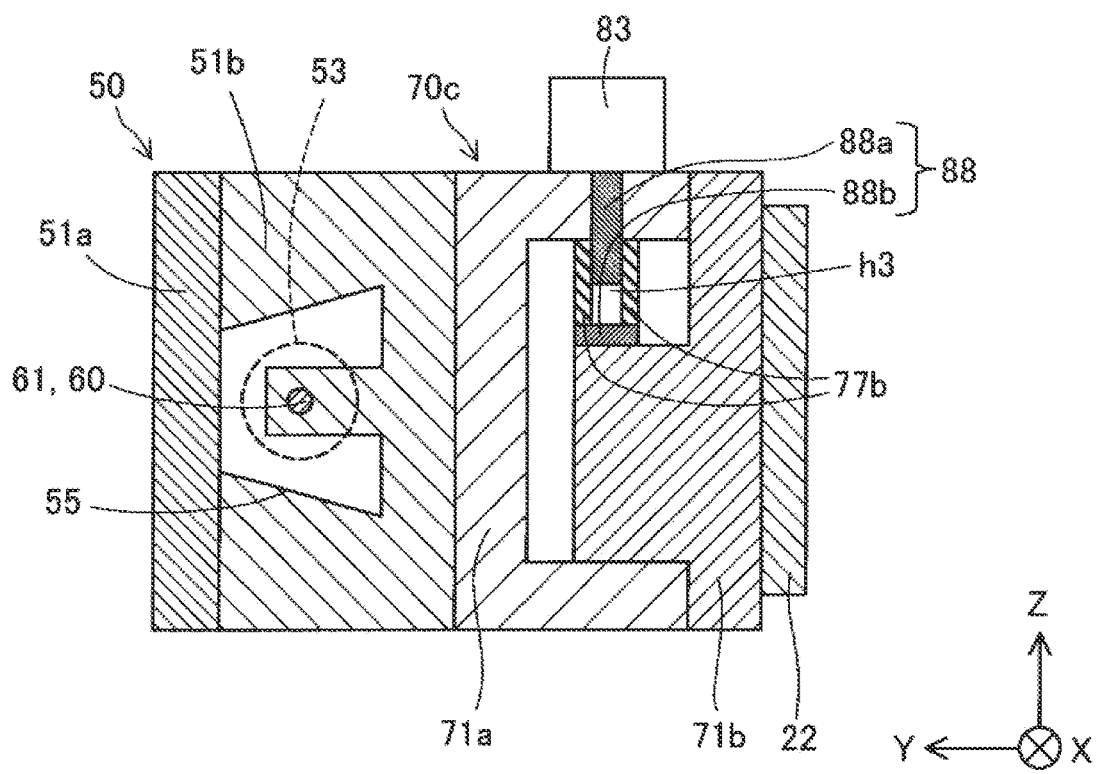
FIG. 25 is a cross-sectional view taken along line XXV-XXV of FIG. 23.
Figure 26:
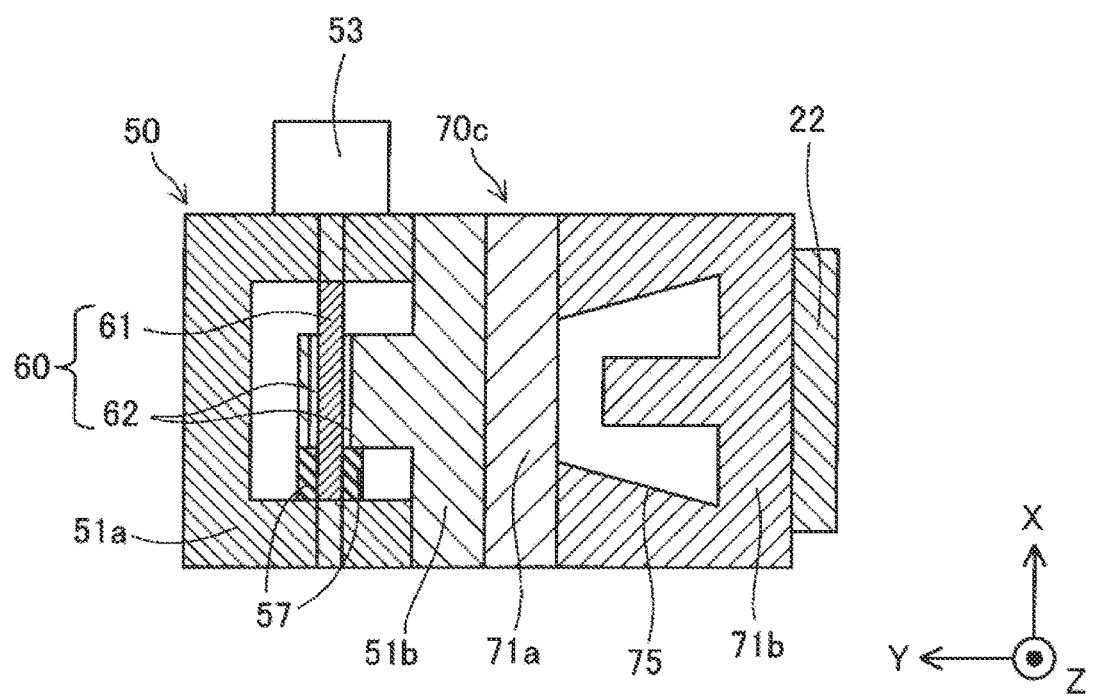
FIG. 26 is a cross-sectional view taken along line XXVI-XXVI of FIG. 24.

A procedure for moving the light receiving element array 22 in the +Z direction in the second moving mechanism 70b will be described with reference to FIG. 22. FIG. 22 corresponds to FIG. 20. The left side of FIG. 22 shows the second moving mechanism 70b in the normal mode, and the right side of FIG. 22 shows the second moving mechanism 70b in the malfunction detection mode. In the normal mode, no voltage is applied to the piezoelectric body 87. Therefore, as shown on the left side of FIG. 22, the elastic member 77a presses the piezoelectric body 87 against the surface in the +Z-direction of the second movable part 71a with an urging force. The movement of the light receiving element array 22 is restricted in the Z direction.

When a voltage is applied to the piezoelectric body 87 when switching from the normal mode to the malfunction detection mode, the piezoelectric body 87 elastically deforms as shown on the right side of FIG. 22. Along with such deformation, the elastic member 77a is compressed in the +Z direction. As a result, the second movable part 71b is pushed up in the +Z direction, and the center position of the light receiving element array 22 in the Z direction moves in the +Z direction, as indicated by the dashed line. In order to return the light receiving element array 22 to its original position, the voltage application to the piezoelectric body 87 should be stopped.

According to the object detection device 10b of the third embodiment having the above configurations, the second moving mechanism 70b includes the piezoelectric body 87 and the second movable parts 71a and 71b for moving the light receiving element array 22 in the Z direction by applying the voltage to the piezoelectric body 87. Therefore, the structure of the second moving mechanism 70b can be made simpler. In the first moving mechanism 50, the piezoelectric body as an actuator may be provided in the same manner as the second moving mechanism 70b. In this case, the motor 53 and the screw mechanism 60 are omitted, and instead of the elastic member 77, the elastic member 77a is provided.

D. Fourth Embodiment

As shown in FIGS. 23, 24, 25 and 26, the object detection device 10c of the fourth embodiment has a second moving mechanism 70c in place of the second moving mechanism 70b. In this respect, it differs from the object detection device 10b.

The second moving mechanism 70c is different from the second moving mechanism 70c of the third embodiment in that the piezoelectric body 87 is omitted, the electromagnet 83 and the iron core 88 are provided, and the elastic member 77b is provided instead of the elastic member 77a.

The electromagnet 83 is arranged on the surface in +Z direction of the second movable part 71b. The electromagnet 83 has a configuration similar to that of the electromagnet of the second embodiment, is excited by energization, and exerts its magnetic force on the iron core 88 to control the movement of the second movable part 71b in the Z direction. The iron core 88 includes a first cylindrical iron core 88a extending in the Z direction and a second cylindrical iron core 88b extending in the Y direction when viewed from the X direction. One end of the first iron core 88a is inserted into a through hole h3 formed between the second movable part 71a and the second movable part 71b, and the other end of the first iron core 88a is in contact with the surface in the −Z direction of the electromagnet 83. The second iron core 88b is arranged on the surface in the +Z direction of the second movable part 71b on the +Y direction side of the second movable part 71b. The elastic member 77b is arranged on the outer peripheral surface of the through hole h3.

Figure 27:
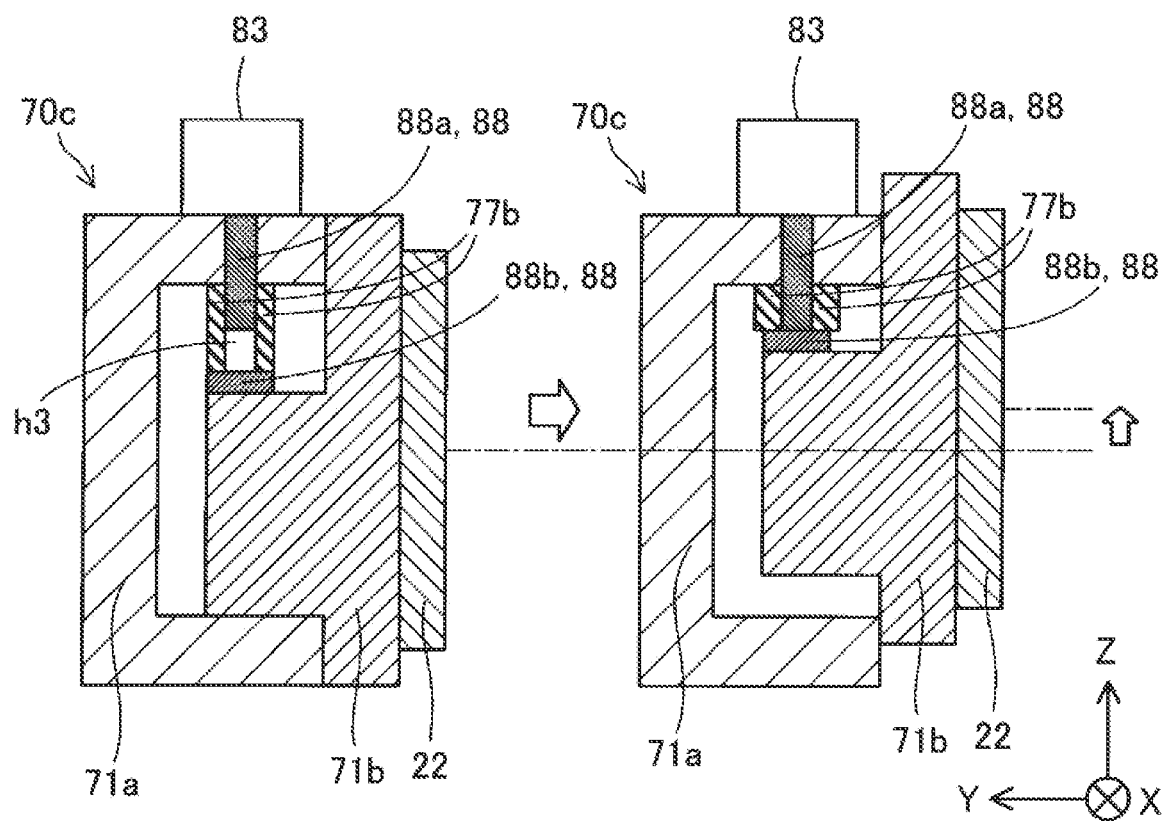
FIG. 27 is an explanatory diagram schematically showing how a second movable part moves.

A procedure for moving the light receiving element array 22 in the +Z direction in the second moving mechanism 70c will be described with reference to FIG. 27. FIG. 27 corresponds to FIG. 25. The left side of FIG. 27 shows the second moving mechanism 70c in the normal mode, and the right side of FIG. 27 shows the second moving mechanism 70c in the malfunction detection mode. In the normal mode, energization to the electromagnet 83 is stopped. Therefore, as shown on the left side of FIG. 27, the first iron core 88a and the second iron core 88b are arranged at positions separated from each other, and the state in which the elastic member 77b extends in the Z direction is maintained. The movement of the light receiving element array 22 is restricted in the +Z direction.

When the electromagnet 83 is energized when the normal mode is shifted to the malfunction detection mode, as shown on the right side of FIG. 27, the magnetic force of the electromagnet 83 is transmitted to the iron core 88, so that the second iron core 88b approaches the first iron core 88a, and the elastic member 77b is deformed (compressed in the Z direction). Along with this deformation, the first iron core 88a and the second iron core 88b are brought into contact with each other, and the second movable part 71b is pushed up in the +Z direction, and the center position of the light receiving element array 22 in the Z direction moves in the +Z direction, as indicated by the dashed line. In order to return the light receiving element array 22 to its original position, the energization to the electromagnet 83 should be stopped.

According to the object detection device 10c of the fourth embodiment having the above configurations, the second moving mechanism 70c is the electromagnet 83 and the second movable part 71a and 71b for moving the light receiving element array 22 along the Z direction by changing the polarity of the electromagnet 83 or adjusting the disappearance of the magnetic field of the electromagnet 83. Therefore, the structure of the second moving mechanism 70b can be made simpler. In the first moving mechanism 50, the electromagnet and the iron core as actuators may be provided in the same manner as the second moving mechanism 70c. In this case, the motor 53 and the screw mechanism 60 are omitted, and instead of the elastic member 77, the elastic member 77b is provided.

E. Fifth Embodiment

In the first embodiment, the first area U1 on the light receiving element array 22 is changed by mechanically moving the light receiving element array 22 in the horizontal direction HD and the vertical direction VD by the first moving mechanism 50 and the second moving mechanism 70. The malfunction detection processing for the light receiving element 220 is executed, and the change and/or movement of the usable area is realized in response to the result of the malfunction detection processing. In contrast, in the fifth embodiment, the first area U1 on the light receiving element array 22 is electronically moved by switching the light receiving element 220 corresponding to the first area U1, and the malfunction detection processing and change and/or movement of the usable area are realized. In the configuration of the object detection device according to the fifth embodiment, the light receiving control unit 21 has an execution function for switching the first area U1 by electronic control, and the rest is the same as that of the object detection device 10 in the first embodiment. Therefore, the same reference numerals as in the first embodiment are used, and description thereof is omitted.

Figure 28:
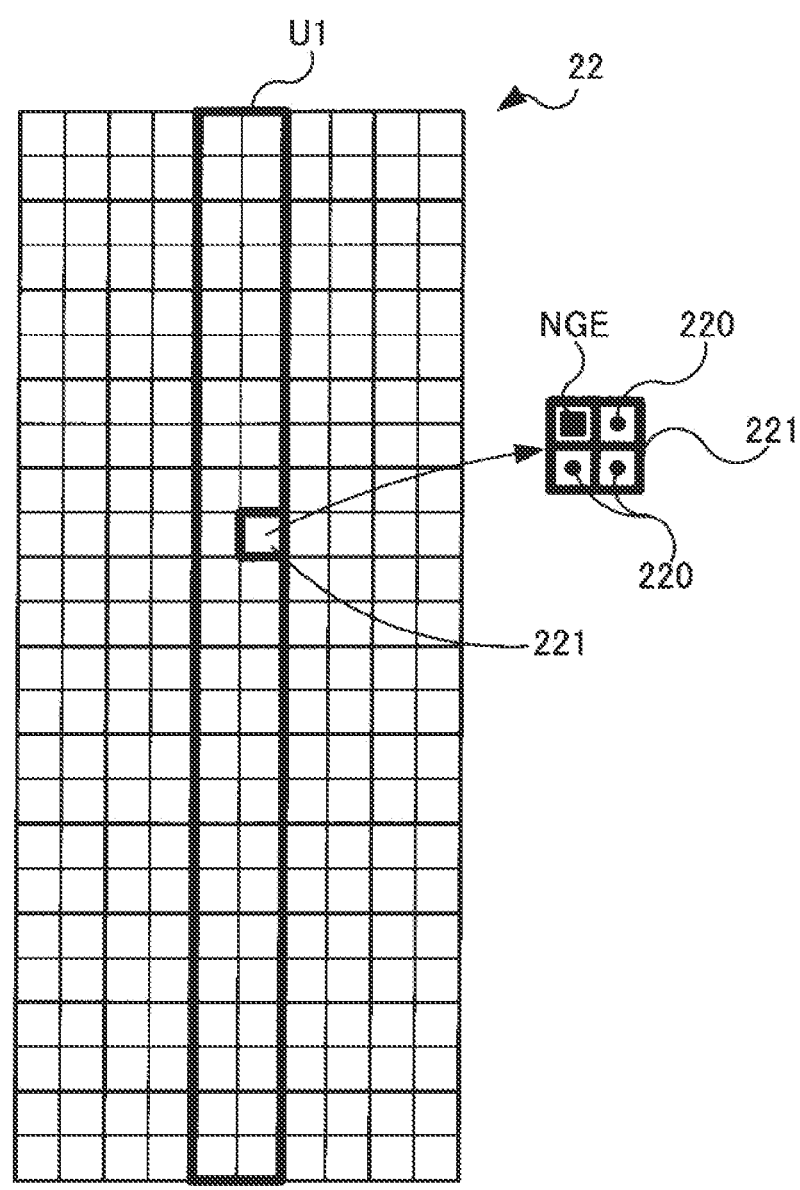
FIG. 28 is an explanatory diagram showing a concept of malfunction detection according to a fifth embodiment.

In the first embodiment, in order to simplify the explanation, the example in which one light receiving element 220 constitutes one light receiving pixel, that is, the light receiving element and the light receiving pixel are used synonymously. In general, a light receiving pixel is used as a term indicating the minimum unit of light receiving processing, that is, a light receiving section corresponding to a detection point in an object detection device, and can be composed of a single light receiving element 220 or a plurality of light receiving elements 220. In the example of FIG. 28, as shown in the enlarged view indicated by the arrow, one light receiving pixel 221 is composed of four light receiving elements 220, and the light receiving element array 22 is composed of a plurality of light receiving pixels 221. Also, in the example of FIG. 28, the light receiving element NGE is the light receiving element 220 that is out of order.

The light receiving section 20, more specifically, the light receiving control unit 21 performs light receiving processing in units of the light receiving elements 220 constituting the light receiving pixels 221 in addition to the light receiving processing in units of the light receiving pixels 221, and can output the first light receiving signal. That is, the light receiving section 20 can switch ON/OFF (light receiving/non-light receiving) of execution of light receiving processing in units of the light receiving element 220 constituting each light receiving pixel 221, in each light receiving pixel 221 forming the first area U1. In the example of FIG. 28, the light receiving section 20 sequentially turns on and off the light receiving processing for the four light receiving elements 220 constituting the light receiving pixel 221, for example, from the upper left to the upper right, and from the lower left to the lower right. As a result, if there is no change in the first light receiving signal between when the light receiving processing is turned on and off in one light receiving element 220, it can be determined that the light receiving element 220 is malfunctioning, that is, out of order. The case where there is no change in the first light receiving signal means that there is no change larger than a predetermined difference in signal intensity or signal value between ON and OFF of execution of the light receiving processing. The designation of each light receiving element 220 in the light receiving control unit 21 can be executed by designating an address associated with a light receiving element number pre-assigned to each light receiving element 220 or pre-assigned coordinate position information, and the ON/OFF of the execution of the light receiving processing is realized by the measurement circuit, for example, connecting or disconnecting the electrical connection with the adder, for the target light receiving element 220.

Figure 29:
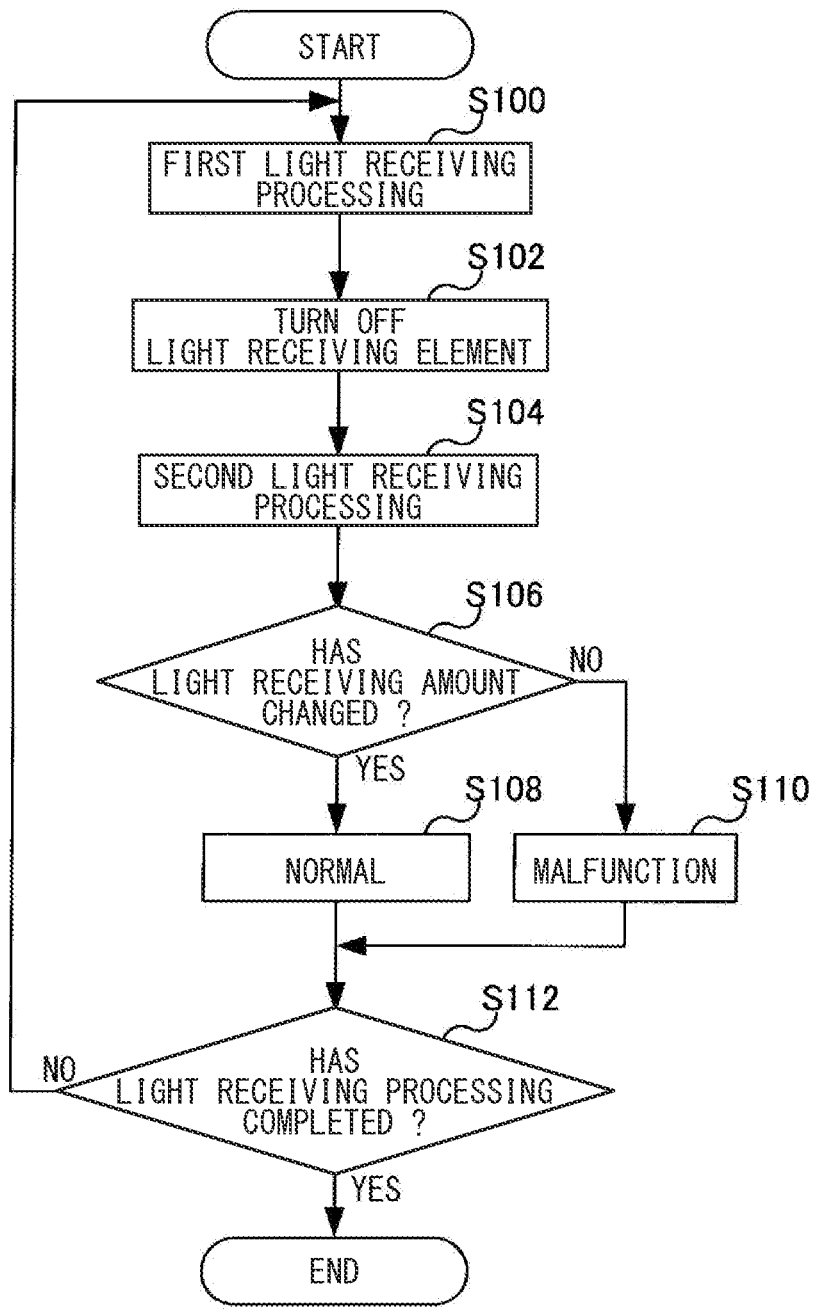
FIG. 29 is a flowchart showing a procedure of malfunction detection processing according to the fifth embodiment.

The malfunction detection part 113 executes the malfunction detection processing in units of the light receiving element shown in FIG. 29. The malfunction detection processing can be performed at predetermined time intervals using ambient light when the object detection device 10 is activated. Alternatively, when a malfunction is detected by the mechanical failure detection processing in the first embodiment, it may be executed to identify the light receiving element 220 having a failure or malfunction. The malfunction detection part 113 turns on all the light receiving elements 220 forming the first area U1 to perform the light receiving processing via the light receiving control unit 21, and performs the first light receiving processing using ambient light (step S100). The malfunction detection part 113 turns off the light receiving elements 220 constituting the first area U1 in units of light receiving elements according to a predetermined order via the light receiving control unit 21, that is, turns off the execution of light receiving processing of one light receiving element 220 (step S102). The malfunction detection part 113 executes the second light receiving processing using the ambient light in the first area U1 (step S104), and determines whether or not there is a change between the light receiving amount during the first light receiving processing and the light receiving amount during the second light receiving processing (step S106). More specifically, the malfunction detection part 113 determines whether or not there is greater than a predetermined difference between the signal value of the first light receiving signal output during the first light receiving processing and the signal value of the first light receiving signal obtained during the second light receiving processing.

When the malfunction detection part 113 determines that the light receiving amount has changed (step S106: Yes), the malfunction detection part 113 determines that the light receiving element 220 whose execution of light receiving processing is turned off is normal (step S108), and the process proceeds to S112. When the malfunction detection part 113 determines that there is no change in the light receiving amount (step S106: No), the malfunction detection part 113 determines that the light receiving element 220 whose execution of the light receiving processing is turned off is out of order (step S110). The light receiving element number and coordinate position information for specifying are stored in the memory 103, and the process proceeds to step S112. This is because the phenomenon in which the light receiving amount does not change depending on whether the execution of the light receiving processing is turned on or off in the target light receiving element 220 means that the target light receiving element 220 cannot receive ambient light when the light receiving processing is turned on. The malfunction detection part 113 determines whether or not the execution of the light receiving processing has been turned off for all the light receiving elements 220 forming the first area U1 (step S112). If the execution OFF of the light receiving processing for all the light receiving elements 220 has not ended (step S112: No), the process proceeds to step S100. In step S102, execution of light receiving processing of the next light receiving element 220 is set to OFF, and steps S104 to S112 are executed. When the execution OFF of the light receiving processing for all the light receiving elements 220 has been completed (step S112: Yes), the malfunction detection part 113 ends this processing routine.

According to the object detection device 10 according to the fifth embodiment, it is possible to electronically detect a failure or malfunction in the first area U1 without providing a configuration for mechanically driving the light receiving element array 22. Further, according to the object detection device 10 according to the fifth embodiment, it is possible to detect a failure or malfunction of the first area U1 in units of the light receiving elements 220. As a result, when executing the object detection processing, it is possible to minimize the movement or change of the usable area for avoiding failure or malfunction in the first area U1.

In the above embodiment, the malfunction detection of the light receiving element 220 is performed by turning off the execution of the light receiving processing in units of the light receiving element 220 over the entire first area U1. According to this procedure, it is possible to detect a failure or malfunction of the light receiving element 220 with high accuracy. On the other hand, the first area U1 may be divided into a predetermined arbitrary number of areas, and the above malfunction detection processing may be executed at different timings for each area in units of divided areas. Alternatively, the first area U1 is divided into two areas, the light receiving processing is performed using all the light receiving elements 220 in each area, the same processing is performed on areas with a small light receiving amount, and when the predetermined number of light receiving pixels 221 is reached, the malfunction detection processing in units of the light receiving element 220 may be executed. In these cases, the time required for malfunction detection processing can be shortened. Furthermore, the first area U1 is divided into two areas, and the above-described malfunction detection processing is performed on each area. In an area where the amount of change in the light receiving amount in each area, that is, the integrated value of the difference is large, the area may be divided into two and the malfunction detection processing may be executed, and these procedures may be repeatedly executed. By comparing signal values by binary search, search efficiency can be improved and detection processing time can be shortened.

F. Sixth Embodiment

Figure 30:
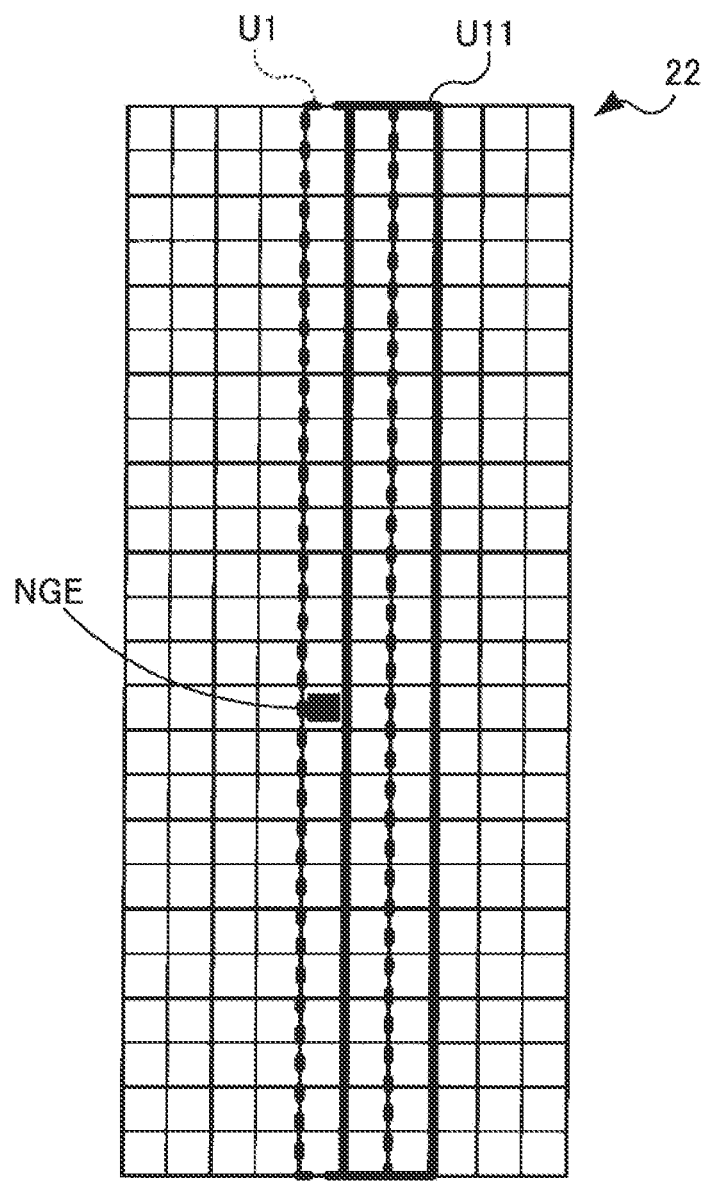
FIG. 30 is and explanatory diagram showing a modified aspect of an usable area according to a sixth embodiment.

In the sixth embodiment, when a failure or malfunction is detected in the light receiving element 220 that constitutes the first area U1 by the malfunction detection processing in the first and fifth embodiments, the object detection processing is performed using the moving usable area U11 obtained by electronically moving the first area U1 as shown in FIG. 30. In this respect, the sixth embodiment differs from the first to fourth embodiments in which the first area U1 is mechanically moved. The basic configuration of the object detection device according to the sixth embodiment is the same as the configuration described in the fifth embodiment, so the same reference numerals are used to omit the description.

The malfunction detection part 113 receives the result of the malfunction detection processing that the light receiving element NGE forming the first area U1 is out of order, and causes the control part 111 to shift to the malfunction countermeasure mode. The control part 111 sets the light receiving element 220 corresponding to the moving usable area U11 as the light receiving pixel 221 used in the first area U1, that is, the light receiving element 220. As described above, the light receiving elements 220 constituting the light receiving element array 22 are assigned in advance addresses that specify their positions. Therefore, by setting the address of the light receiving element 220 corresponding to the moving usable area U11 as the light receiving element 220 used for the object detection processing instead of the address of the light receiving element 220 corresponding to the first area U1, the object detection processing using the moving usable area U11, that is, light receiving processing for receiving reflected light according to the radiated light emitted from the light emitting section 30 can be realized. In the example of FIG. 30, the usable area is slid while leaving an overlapping area in the horizontal direction in the drawing in order to avoid the malfunctioning light receiving element NGE. Depending on the position of the malfunctioning light receiving element NGE, If there is no overlapping area, or if the first area U1 does not cover the entire area in the vertical direction (longitudinal direction), the moving usable area which shifts in the vertical direction or the horizontal direction and in the vertical direction may be set.

According to the object detection device 10 according to the sixth embodiment, the first area U1 can be changed without using a driving portion for mechanically driving the light receiving element array 22. In addition, since the moving usable area U11 is realized by horizontally moving the first area U1, the usable area can be changed while maintaining the continuity between the light receiving elements 220 for light receiving characteristics such as SN. Further, it is possible to execute the object detection processing by executing the same light receiving control as in the first area U1. When the malfunction detection processing is performed by dividing the first area U1 into a plurality of areas, only the area including the malfunctioning light receiving element NGE may be moved. In this case, it is possible to suppress the decrease in SN accompanying the movement of the first area U1.

G. Seventh Embodiment

Figure 31:
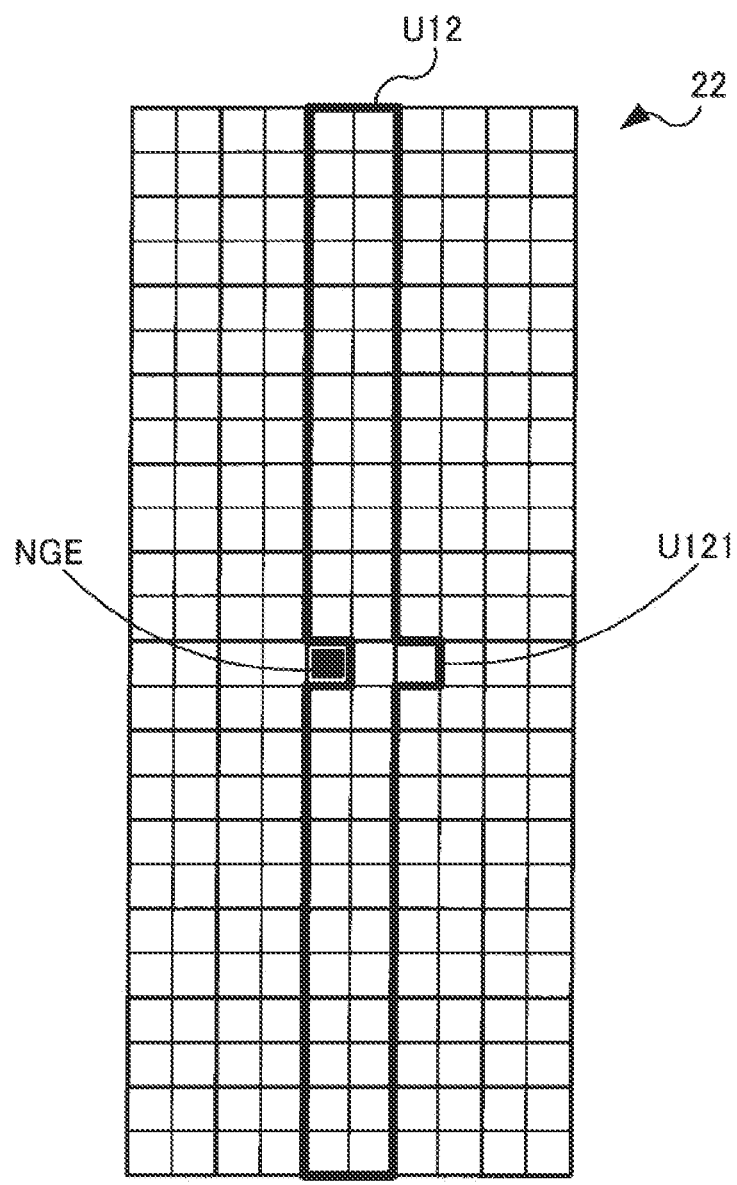
FIG. 31 is an explanatory diagram showing a modified aspect of an usable area according to a seventh embodiment.

In the seventh embodiment, when a failure or malfunction is detected in the light receiving element 220 forming the first area U1 by the malfunction detection processing in the fifth embodiment, as shown in FIG. 31, the object detection processing is executed using a moving usable area U12 obtained by electronically moving a part of the usable area. The basic configuration of the object detection device according to the seventh embodiment is the same as the configuration described in the fifth embodiment, so the same reference numerals are used to omit the description. Also, in FIG. 31, the first area U1 overlaps with the moving usable area U21, so the description thereof is omitted.

The malfunction detection part 113 receives the result of the malfunction detection processing that the light receiving element NGE forming the first area U1 is out of order, and causes the control part 111 to shift to the malfunction countermeasure mode. The control part 111 sets the light receiving element 220 corresponding to the moving usable area U12 as the light receiving pixel 221 used in the first area U1, that is, the light receiving element 220. In the seventh embodiment, out of the light receiving elements 220 forming the first area U1, only the malfunctioning light receiving element NGE is excluded from the first area U1, and the moving usable area U12 in which one part of the first area includes the substitute light receiving element 121. That is, as the light receiving element 220 used for the object detection processing, instead of the address of the malfunctioning light receiving element NGE in the first area U1, the address of the light receiving element 220 corresponding to the moving usable area U12 added with the address of the substitute light receiving element 121 is set, and the object detection processing using the moving usable area U12 is realized. The movement of the first area U1 in the seventh embodiment is realized by a malfunction detection processing capable of identifying the malfunctioning light receiving element 220, that is, by combing with the malfunction detection processing described in the fifth embodiment.

According to the object detection device 10 according to the seventh embodiment, the first area U1 can be changed without using a driving portion for mechanically driving the light receiving element array 22. Further, since the moving usable area U12 is realized by excluding only the malfunctioning light receiving element NGE from the light receiving elements 220 constituting the usable area UI, the same SN as in the case of using the first area U1 can be maintained. That is, since the first area U1 set as the initial position is set to the area with the best SN in the light receiving element array 22, a desired light receiving characteristics can be obtained by maintaining the light receiving elements 220 other than the malfunctioning light receiving element NGE. The partial area is not limited to the case where the number of malfunctioning light receiving elements NGE is one, and can be applied similarly to the case where there are a plurality of malfunctioning light receiving elements NGE.

H. Eighth Embodiment

Figure 32:
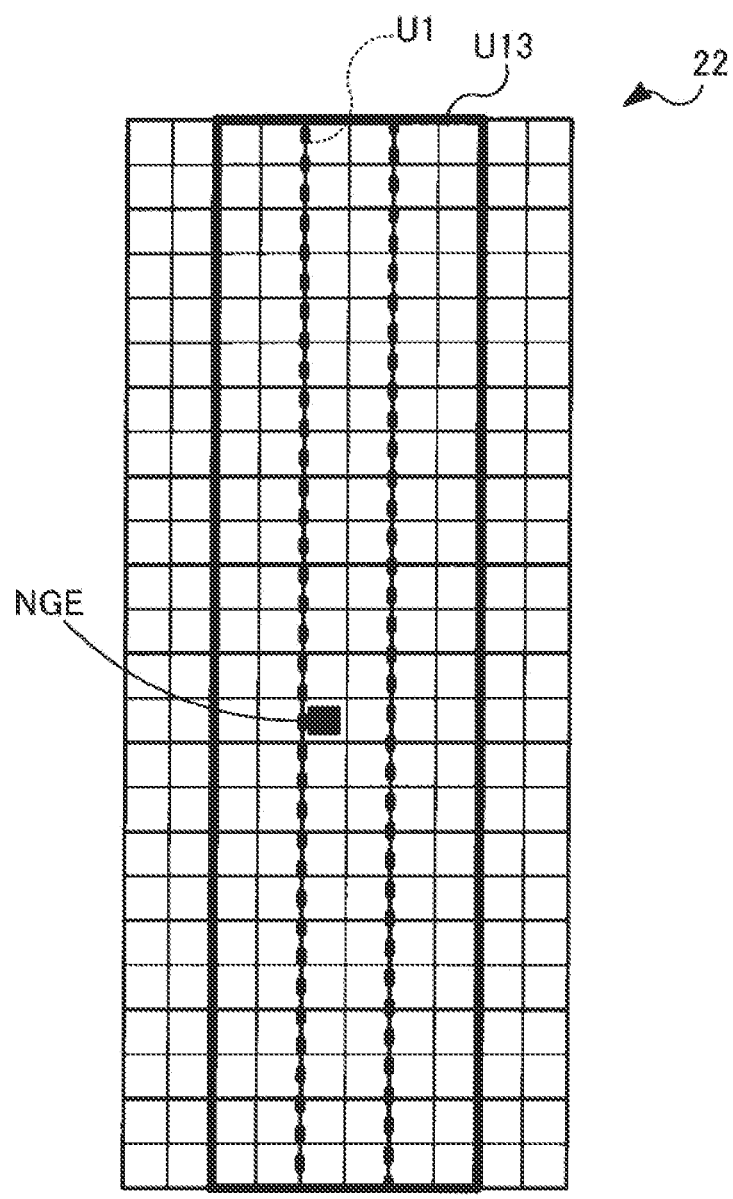
FIG. 32 is and explanatory diagram showing a modified aspect of an usable area according to an eighth embodiment.

In the eighth embodiment, when a failure or malfunction is detected in the light receiving element 220 that constitutes the first area U1 by the malfunction detection processing in the first and fifth embodiments, the object detection processing is performed using the expanding usable area U13 obtained by electronically expanding the first area U1 as shown in FIG. 32. In this respect, the eighth embodiment differs from the sixth and seventh embodiments. The basic configuration of the object detection device according to the eighth embodiment is the same as the configuration described in the fifth embodiment, so the same reference numerals are used to omit the description thereof.

The malfunction detection part 113 receives the result of the malfunction detection processing that the light receiving element NGE forming the first area U1 is out of order, and causes the control part 111 to shift to the malfunction countermeasure mode. The control part 111 sets the light receiving element 220 corresponding to the expanding usable area U13 as the light receiving pixel 221 used in the first area U1, that is, the light receiving element 220. In the eighth embodiment, the expanding usable area U13 that includes the first area U1 together with the light receiving element NGE that has been identified as being malfunction and that is expanded in the horizontal direction is used. That is, as the light receiving elements 220 used in the object detection processing, in addition to the addresses of the light receiving elements 220 forming the first area U1, the addresses of the light receiving elements 220 corresponding to the expanding usable area U13 are set by adding the addresses of the light receiving elements 220 expanded as the expanding usable area U13, and the object detection processing using the expanding usable area U13 is realized.

According to the object detection device 10 according to the eighth embodiment, the first area U1 can be changed without using a driving portion for mechanically driving the light receiving element array 22. Further, since the expanding usable area U13 is realized by expanding the first area U1, it is possible to compensate for the decrease in signal intensity due to the lack of the malfunctioning light receiving element 220. When the malfunction detection processing is performed by dividing the first area U1 into a plurality of areas, only the area including the malfunctioning light receiving element NGE may be expanded. In this case, it is possible to suppress noise generation accompanying expansion of the first area U1.

I. Other Embodiments (1) In each of the above embodiments, the third area U3 was located in the +Z direction of the first area U1, but may be located in the −Z direction of the first area U1. In this case, in the second moving mechanisms 70, 70a, 70b, and 70c, by moving the second movable part 71b in the −Z direction with respect to the second movable part 71a, the usable area is changed from the first area U1 to the third area U3. Also, when shifting from the malfunction detection mode to the malfunction countermeasure mode, the usable area was returned from the third area U3 to the first area U1 and then moved to the second area U2. However, the procedure for returning to the first area U1 may be omitted. That is, the second area U2 may be an area obtained by translating the third area U3 in the X direction.

(2) In the above-described first embodiment, the first moving mechanism 50 and the second moving mechanism 70 may be pressed against each other using an elastic member, in order to remove the backlash of the screw members (positional error caused by gaps between components that transmit driving force). Also, the guides 55 and 75 may be omitted. In this case, the light receiving lens 23 and the light receiving element array 22 may be kept parallel in the X and Z directions using the screw mechanisms 60 and 80.

(3) In each of the above embodiments, if there is a possibility that the light receiving element 220 in the first area U1 is out of order, or if it is determined that the light receiving element 220 is out of order, an object may be detected using a sensor such as an imaging device or a lidar other than the distance measuring unit 200. Further, the malfunction of the light receiving element may be notified to the user of the object detection device 10, for example, the occupant of the vehicle in which the object detection device 10 is mounted, the manager of the vehicle, or the like.

(4) In the third and fourth embodiments, the first moving mechanism 50 of the first embodiment is used as the first moving mechanism, but instead of this moving mechanism, the first moving mechanism of the second embodiment may be used. The first moving mechanisms 50, 50a and the second moving mechanisms 70, 70b, 70c, 70d in each embodiment can be used in any combination.

(5) In each of the above-described embodiments, the possibility of malfunction of the light receiving element 220 or the malfunction of the light receiving element 220 is detected by the presence or absence of a black line appearing in the ambient light image, that is, the presence or absence of the pixel row whose luminance value is equal to or less than a first predetermined value. However, instead of the black line, or in addition to the presence or absence of the black line, the possibility of malfunction of the light receiving element 220 or the malfunction of the light receiving element 220 may be detected by the presence or absence of the white line, that is, the presence or absence of the pixel row forming a bright line whose brightness value is equal to or greater than a second predetermined value different from the first predetermined value. In this case, it is only necessary to detect whether or not a pixel group having a luminance value of 255 is arranged along the X direction in the image data of the ambient light image. Further, the luminance value is not limited to 255, and a value equal to or higher than the luminance value used as the reference value for high luminance may be used. Further, when the luminance difference between the luminance value of the pixel row forming the black line or the white line and the luminance value of the pixel row adjacent to the pixel row forming the black line or the white line is equal to or greater than a predetermined difference value, the presence of a black line or a white line may be determined, ie, malfunction of light receiving element 220 may be determined. For example, when it is very bright, the ambient light image is bright overall, and when it is nighttime, the ambient light image is overall dark. Therefore, if only the determination condition is that the luminance value of the pixel row is equal to or less than the first predetermined value or equal to or greater than the second predetermined value, and when the entire ambient light image may be bright or dark, there is a possibility that the malfunction of the light receiving element 220 is determined. Therefore, by using the difference in luminance value between the target pixel row and the pixel row adjacent to the target pixel row that is equal to or less than a first predetermined value or equal to or greater than a second predetermined value as a further determination condition, the black line or white line discrimination accuracy can be improved.

(6) In each of the above embodiments, when the black line is detected, the control part 111 determines the possibility of malfunction, changes the usable area from the first area U1 to the third area U3, and the malfunction detection part 113 determines the malfunction of the light receiving element 220 by determining whether or not the position of the detected black line has moved. Instead of this configuration, the malfunction detection part 113 may determine the malfunction of the light receiving element 220, when a pixel row having a luminance value equal to or lower than a first predetermined value or a pixel row having a luminance value equal to or higher than a second predetermined value is continuously detected at the same position in a plurality of acquired ambient light images.

(7) The control units and methods described in the present disclosure may be implemented by a special purpose computer which is configured with a memory and a processor programmed to execute one or more particular functions embodied in computer programs of the memory. Alternatively, the control units and the methods thereof described in the present disclosure may be realized by a dedicated computer provided by configuring a processor with one or more dedicated hardware logic circuits. Alternatively, the control units and the methods thereof described in the present disclosure may be implemented by one or more dedicated computers configured by a combination of a processor and a memory programmed to execute one or more functions, and a processor with one or more hardware logic circuits. The computer programs may be stored, as instructions to be executed by a computer, in a tangible non-transitory computer-readable medium.

The present disclosure should not be limited to the embodiments described above, and various other embodiments may be implemented without departing from the scope of the present disclosure. For example, the technical features in each embodiment corresponding to the technical features in the form described in the summary may be used to solve some or all of the above-described problems, or to provide one of the above-described effects. In order to achieve a part or all, replacement or combination can be appropriately performed. Also, if the technical features are not described as essential in the present specification, they can be deleted as appropriate.

What is claimed is:

1. An object detection device for detecting an object, comprising:
   a light receiving section having a light receiving surface in which a plurality of light receiving elements receiving incident light including reflected light of emitted radiated light are arranged in a plane, and configured to output a first light receiving signal according to a light receiving state of a light receiving element of the plurality of light receiving elements in a first area and a third light receiving signal according to the light receiving state of the light receiving element in a third area, when a predetermined usable area in usable areas on the light receiving surface is referred to as the first area and the third area is defined as an area different from or partially overlapping the first area;
   an image acquisition part configured to acquire a first ambient light image indicating a light receiving intensity of ambient light using the first light receiving signal and acquire a third ambient light image indicating the light receiving intensity of ambient light using the third light receiving signal; and
   a malfunction detection part configured to detect a malfunction of the light receiving element in the first area using the first ambient light image and the third ambient light image, and detect a failure of the light receiving element in the first area responsive to a position of a pixel group in the first ambient light image having moved in the third ambient light image, the pixel group having a luminance value equal to or less than a first predetermined value or equal to or more than a second predetermined value different from the first predetermined value.

2. The object detection device according to claim 1, wherein
   the light receiving section is capable of outputting the first light receiving signal in units of divided areas obtained by dividing the first area into a plurality of predetermined areas, and
   the malfunction detection part detects the malfunction of the light receiving element in the first area using the first light receiving signal which is output in units of the divided areas.

3. The object detection device according to claim 1, wherein
   the light receiving section is capable of outputting the first light receiving signal in units of the plurality of light receiving elements in the first area, and
   the malfunction detection part detects the malfunction of the light receiving element in the first area using the first light receiving signal which is output in units of the light receiving element.

4. The object detection device according to claim 1, further comprising,
   an object detection part configured to detect the object using a second light receiving signal which is output from the light receiving section,
   a first moving mechanism configured to move the predetermined usable area to a second area located in a first direction with respect to the first area, and
   a control part configured to control driving of the first moving mechanism, wherein
   the light receiving section outputs the second light receiving signal according to the light receiving state of the light receiving element in the second area, and
   the object detection part detects the object using the second light receiving signal when the malfunction of the light receiving element within the first area is detected.

5. The object detection device according to claim 1, wherein
   the malfunction detection part detects that there is a possibility that the light receiving element within the first area is out of order, when the pixel group is arranged along a first direction, in an image data of the first ambient light image.

6. The object detection device according to claim 5, further comprising,
   a second moving mechanism configured to move the predetermined usable area to the third area positioned in a second direction perpendicular to the first direction with respect to the first area, and
   a control part configured to control driving of the second moving mechanism, wherein
   the image acquisition part acquires the third ambient light image using the third light receiving signal when it is detected that there is the possibility that the light receiving element within the first area is out of order, and
   the malfunction detection part detects that the light receiving element within the first area is out of order, when the pixel group moves in the second direction with respect to an original pixel position as the predetermined usable area moves from the first area to the third area, in the image data of the third ambient light image which is acquired.

7. The object detection device according to claim 4, wherein
   the first moving mechanism has
      a screw mechanism,
      a motor configured to drive the screw mechanism, and
      a first movable part configured to move the light receiving surface along the first direction by driving the screw mechanism.

8. The object detection device according to claim 4, wherein
   the first moving mechanism has
      a lock mechanism configured to restrict movement of the light receiving surface in the first direction,
      a drive part configured to control switching between a locked state and a released state of the lock mechanism, and
      a first movable part configured to move the light receiving surface along the first direction by setting the lock mechanism to the released state.

9. The object detection device according to claim 4, wherein
the first moving mechanism has
a piezoelectric body, and
a first movable part configured to move the light receiving surface along the first direction by applying the piezoelectric body.

10. The object detection device according to claim 4, wherein
the first moving mechanism has
an electromagnet, and
a first movable part configured to move the light receiving surface along the first direction by changing a polarity of the electromagnet or adjusting an extinction of a magnetic field.

11. The object detection device according to claim 6, wherein
the second moving mechanism has
a screw mechanism,
a motor configured to drive the screw mechanism, and
a second movable part configured to move the light receiving surface along the second direction by driving the screw mechanism.

12. The object detection device according to claim 6, wherein
the second moving mechanism has
a lock mechanism configured to restrict movement of the light receiving surface in the first direction,
a drive part configured to control switching between a locked state and a released state of the lock mechanism, and
a second movable part configured to move the light receiving surface along the second direction by setting the lock mechanism to the released state.

13. The object detection device according to claim 6, wherein
the second moving mechanism has
a piezoelectric body, and
a second movable part configured to move the light receiving surface along the second direction by applying the piezoelectric body.

14. The object detection device according to claim 6, wherein
the second moving mechanism has
an electromagnet, and
a second movable part configured to move the light receiving surface along the second direction by changing a polarity of the electromagnet or adjusting an extinction of a magnetic field.

15. The object detection device according to claim 1, further comprising,
an object detection part configured to detect the object using a second light receiving signal which is output from the light receiving section, wherein
the light receiving section has a light receiving control part that receives the incident light by moving the predetermined usable area in at least one of a first direction and a second direction orthogonal to the first direction, and
when the malfunction of the light receiving element in the first area is detected,
the light receiving control part moves the predetermined usable area to a second area positioned in the first direction with respect to the first area to receive the incident light,
the light receiving section outputs the second light receiving signal according to the light receiving state of the light receiving element in the second area, and
the object detection part detects the object using the second light receiving signal.

16. The object detection device according to claim 1, further comprising,
an object detection part configured to detect the object using a second light receiving signal which is output from the light receiving section, wherein
the light receiving section has a light receiving control part that receives the incident light by expanding the predetermined usable area in at least one of a first direction and a second direction orthogonal to the first direction, and
when the malfunction of the light receiving element in the first area is detected,
the light receiving control part expands the predetermined usable area to a second area positioned in the first direction with respect to the first area to receive the incident light,
the light receiving section outputs the second light receiving signal according to the light receiving state of the light receiving element in the second area, and
the object detection part detects the object using the second light receiving signal.

17. The object detection device according to claim 3, further comprising,
an object detection part configured to detect the object using a second light receiving signal which is output from the light receiving section, wherein
the light receiving section has a light receiving control part that receives the incident light by moving a partial area of the predetermined usable area corresponding to the light receiving element in at least one of a first direction and a second direction orthogonal to the first direction, and
when the malfunction of the light receiving element in the first area is detected,
the light receiving control part moves the partial area of the predetermined usable area to a second area positioned in the first direction with respect to the first area to receive the incident light,
the light receiving section outputs the second light receiving signal according to the light receiving state of the light receiving element in the second area, and
the object detection part detects the object using the second light receiving signal.

18. A method of detecting a malfunction of an object detection device, comprising:
outputting a first light receiving signal according to a light receiving state of a light receiving element in a first area and a third light receiving signal according to the light receiving state of the light receiving element in a third area, when a first area is defined as one of a plurality of predetermined usable areas on a light receiving surface in which a plurality of light receiving elements capable of receiving incident light including reflected light of emitted radiated light are arranged in a plane and a third area is defined as an area different from or partially overlapping the first area;
acquiring a first ambient light image indicating a light receiving intensity of ambient light using the first light receiving signal and acquiring a third ambient light image indicating the light receiving intensity of ambient light using the third light receiving signal; and detecting a malfunction of the light receiving element in the first area using the first ambient light image and the third ambient light image, and detecting a failure of the light receiving element in the first area responsive to a position of a pixel group in the first ambient light image having moved in the third ambient light image, the pixel group having a luminance value equal to or less than a first predetermined value or equal to or more than a second predetermined value different from the first predetermined value.

19. An object detection device for detecting an object, comprising:
   a light receiving section having a light receiving surface in which a plurality of light receiving elements receiving incident light including reflected light of emitted radiated light are arranged in a plane, and
   a computer including a processor and a memory that stores instructions configured to, when executed by the processor, cause the processor to
   output a first light receiving signal according to a light receiving state of a light receiving element of the plurality of light receiving elements in a first area and a third light receiving signal according to the light receiving state of the light receiving element in a third area, when a predetermined usable area in usable areas on the light receiving surface is referred to as the first area and the third area is defined as an area different from or partially overlapping the first area;
   acquire a first ambient light image indicating a light receiving intensity of ambient light using the first light receiving signal and acquire a third ambient light image indicating the light receiving intensity of ambient light using the third light receiving signal; and
   detect a malfunction of the light receiving element in the first area using the first ambient light image and the third ambient light image, and detect a failure of the light receiving element in the first area responsive to a position of a pixel group in the first ambient light image having moved in the third ambient light image, the pixel group having a luminance value equal to or less than a first predetermined value or equal to or more than a second predetermined value different from the first predetermined value.

20. The object detection device according to claim 1, further comprising
   a first moving mechanism configured to move the predetermined usable area to a second area located in a first direction with respect to the first area,
   a second moving mechanism configured to move the predetermined usable area to the third area positioned in a second direction perpendicular to the first direction with respect to the first area, wherein
   the light receiving section outputs a second light receiving signal according to the light receiving state of the light receiving element in the second area,
   in response to detecting that there is a possibility that the light receiving element in the first area is out of order, the second moving mechanism moves the predetermined usable area to the third area and the image acquisition part acquires the third ambient light image using the third light receiving signal as a malfunction detection mode,
   in response to the pixel group having moved in the second direction with respect to an original pixel position as the predetermined usable area has moved from the first area to the third area, the malfunction detection part detects that the light receiving element within the first area is out of order, the first moving mechanism moves the predetermined usable area to the second area and an object detection part detects the object using the second light receiving signal as a malfunction countermeasure, and
   in response to the pixel group not having moved in the second direction, the second moving mechanism changes the predetermined usable area to the first area as a normal mode.

* * * * *